United States Patent
Durrant-Whyte et al.

(10) Patent No.: US 8,315,838 B2
(45) Date of Patent: Nov. 20, 2012

(54) METHOD AND SYSTEM FOR EXPLOITING INFORMATION FROM HETEROGENEOUS SOURCES

(75) Inventors: Hugh Durrant-Whyte, Rozelle (AU); Fabio Tozeto Ramos, Alexandria (AU); Peter James Hatherly, Lavendar Bay (AU)

(73) Assignee: The University of Sydney, New South Wales (AU)

( * ) Notice: Subject to any disclaimer, the term of this patent is extended or adjusted under 35 U.S.C. 154(b) by 480 days.

(21) Appl. No.: 12/398,171

(22) Filed: Mar. 4, 2009

(65) Prior Publication Data

US 2009/0240481 A1 Sep. 24, 2009

(30) Foreign Application Priority Data

Mar. 4, 2008 (AU) ................................ 2008901043

(51) Int. Cl.
*G06F 17/50* (2006.01)
(52) U.S. Cl. ............................................................. 703/1
(58) Field of Classification Search .......... 299/8; 703/1, 703/10, 6, 9; 702/6, 7, 9; 700/29, 31, 30
See application file for complete search history.

(56) References Cited

U.S. PATENT DOCUMENTS

| | | | |
|---|---|---|---|
| 3,658,260 A | 4/1972 | Williams | |
| 3,975,053 A * | 8/1976 | Kochanowsky | 299/7 |
| 5,005,147 A * | 4/1991 | Krishen et al. | 703/13 |
| 5,925,081 A * | 7/1999 | Hawkins et al. | 701/24 |
| 6,052,520 A * | 4/2000 | Watts, III | 703/10 |
| 6,236,894 B1 * | 5/2001 | Stoisits et al. | 700/28 |
| 6,507,366 B1 | 1/2003 | Lee | |
| 2002/0112381 A1 * | 8/2002 | Mizutani | 37/352 |
| 2004/0252288 A1 | 12/2004 | Kacyra et al. | |
| 2005/0283294 A1 | 12/2005 | Lehman, Jr. et al. | |
| 2006/0221072 A1 | 10/2006 | Se et al. | |

(Continued)

FOREIGN PATENT DOCUMENTS

CN 1232197 10/1999

OTHER PUBLICATIONS

Mincom—Stratmodel, 2006, retrieved from the internet: http://web.archive.org/web/2007020406094/http://www.mincom.com/solutions/minescape/stratmodel.aspx (Sep. 5, 2008).

(Continued)

*Primary Examiner* — Dwin M Craig
*Assistant Examiner* — Bernard E Cothran
(74) *Attorney, Agent, or Firm* — Blakely, Sokoloff, Taylor & Zafman LLP

(57) ABSTRACT

A system and method are described for generating a model of an environment in which a plurality of equipment units are deployed for the extraction of at least one resource from the environment. The system comprises a pre-extraction modeling unit configured to receive data from a first plurality of heterogeneous sensors in the environment and to fuse the data into a pre-extraction model. An equipment modeling unit is configured to receive equipment data relating to the plurality of equipment units and to combine the equipment data into an equipment model. A post-extraction modeling unit is configured to receive data from a second plurality of sensors and to fuse the data into a post-extraction model. Information from the pre-extraction model, the equipment model and/or the post-extraction model is communicable to the equipment units for use in controlling operation of the equipment units in the environment.

22 Claims, 17 Drawing Sheets

U.S. PATENT DOCUMENTS

2007/0046448 A1 3/2007 Smitherman
2010/0098328 A1 4/2010 Se et al.

OTHER PUBLICATIONS

Mincom—Mincom MineScape, 2006, retrieved from the Internet: http://web.archive.org/web/20070127195315/http://www.mincom.com/solutions/minescape/default.aspx (Sep. 5, 2008).

Australian Patent Office International-Type Search Report for Counterpart Australian Application No. 2008901043, 2 pgs. (Sep. 9, 2008).

Dell PowerEdge M1000e Modular Blade Enclosure Product Details, http://www.dell.com/content/products/productdetails.aspx/pedge_M1000e?c=us&cs=555$..., 3 pgs. (Printed May 18, 2009).

Dell PowerEdge M600 Blade Server Product Details, http://www.dell.com/content/products/productdetails.aspx/pedge_m600?c=us$cs=555&l=..., 3 pgs. (Printed May 18, 2009).

Extreme Rugged EBX Single Board Computer, http://www.ampro.com/Products/LittleBoard/LittleBoard_800/, 1 pg. (Printed May 18, 2009).

Chilean Patent Application No. 511-09, Informe Pericial Sobre Solicitud de Patente de Invención, Dated Apr. 3, 2009, 5 pages.

Chilean Patent Application No. 511-09, Respuesta Del Perito Sobre Solicitud de Patente de Invención, Dated Apr. 3, 2009, 5 pages.

Chinese Patent Application No. 200910127315.1, Notification of the First Office Action, Issue Date Apr. 24, 2012, 5 pages.

European Patent Application No. 09716795.1, Supplementary European Search Report, Dated Jun. 6, 2011, 5 pages.

U.S. Appl. No. 12/398,169, Non-Final Office Action, Dated Sep. 2, 2011, 8 pages.

Chinese Patent Application No. 200910127315.1, Text of the First Office Action, Issue Date Apr. 24, 2012, 3 pages.

* cited by examiner

METHOD AND SYSTEM FOR EXPLOITING INFORMATION FROM HETEROGENEOUS SOURCES

CROSS-REFERENCE TO RELATED PATENT APPLICATIONS

This application claims the right of priority under 35 U.S.C. §119 based on Australian patent application no. 2008901043, filed 4 Mar. 2008, which is incorporated by reference herein in its entirety.

FIELD OF THE INVENTION

The present invention relates to a method and system for exploiting information from heterogeneous sources.

BACKGROUND OF THE INVENTION

The exploitation of a mine is a complex and expensive task. As technology advances, various tools are being used to enhance the different procedures in place in order to save costs, optimize efficiency, or improve the quality of the final product. Some examples of these new technologies are autonomous drills, which are used to bore holes into hard materials, and which do not require an operator to handle the drill during the drilling task. Another example is the use of autonomous trucks, which require no driver and therefore significantly cut down the human resources required for the exploitation of the mine.

While these new resources help in addressing very specific problems associated with the exploitation of the mine, their presence causes new problems related to the overall process and the integration of these new tools into the system.

Therefore there is a need for better integration of old and new resources within the existing mine exploitation procedures, as well as enhancing the use of new resources and tools that are emerging due to advances in technology.

Similar needs exist in other areas of technology involving the extraction of a resource from a surrounding environment, for example in forestry and agricultural applications and in other areas such as analysis of oceans in maritime applications.

SUMMARY OF THE INVENTION

According to a first aspect of the invention there is provided a system for generating a model of an environment in which a plurality of equipment units are deployed for the extraction of at least one resource from the environment, the system comprising:

a) a pre-extraction modelling unit configured to receive data from a first plurality of heterogeneous sensors in the environment and to fuse the data into a pre-extraction model descriptive of the environment and the at least one resource;

b) an equipment modelling unit configured to receive equipment data relating to the plurality of equipment units operating in the environment and to combine the equipment data into an equipment model;

c) a post-extraction modelling unit configured to receive data from a second plurality of sensors and to fuse the data into a post-extraction model descriptive of material extracted from the environment, wherein at least one of the equipment units operates to extract the at least one resource from the environment; and wherein requested information from at least one of the pre-extraction model, the equipment model and the post-extraction model is communicable to the equipment units for use in controlling operation of the equipment units in the environment.

According to a second aspect of the invention there is provided a system for generating a model of a mine in which a plurality of equipment units are deployed for the extraction of at least one resource from the mine, the system comprising:

a) an in-ground modelling unit configured to receive data from a first plurality of heterogeneous sensors in the mine and to fuse the data into an in-ground model descriptive of the mine and the at least one resource;

b) an equipment modelling unit configured to receive equipment data relating to the plurality of equipment units deployed in the mine and to combine the equipment data into an equipment model;

c) an out-of-ground modelling unit configured to receive data from a second plurality of sensors and to fuse the data into an out-of-ground model descriptive of material extracted from the mine, wherein at least one of the equipment units operates to extract the at least one resource from the resource; and wherein requested information from at least one of the in-ground model, the equipment model and the out-of-ground model is communicable to the equipment units for use in controlling operation of the equipment units in the mine.

According to a further aspect of the invention there is provided a system for exploiting a mine, comprising:

a database storing an in-ground model and an equipment model;

a communication module for exchanging data with a plurality of operation units;

a fusion module adapted to fuse in-ground information relative to geometrical, geological and geophysical properties of an in-ground material into said in-ground model in order to update said in-ground model, to fuse equipment information relative to pieces of equipment into said equipment model in order to update said equipment model, and to fuse out-of-ground information relative to geophysical, chemical and grade properties of an out-of-ground material with information about said in-ground model and said equipment model in order to create an out-of-ground model.

According to a further aspect of the invention there is provided a method of generating a model of an environment in which a plurality of equipment units are deployed for the extraction of at least one resource from the environment, the method comprising:

a) receiving data from a first plurality of heterogeneous sensors in the environment;

b) fusing the data into a pre-extraction model descriptive of the environment and the at least one resource;

c) receiving equipment data relating to the plurality of equipment units operating in the environment;

d) combining the equipment data into an equipment model;

e) receiving data from a second plurality of sensors;

f) fusing the data from the second plurality of sensors into a post-extraction model descriptive of material extracted from the environment, wherein at least one of the equipment units operates to extract the at least one resource from the environment; and g) communicating information from at least one of the pre-extraction model, the equipment model and the post-extraction model to the equipment units for use in controlling operation of the equipment units in the environment.

According to a further aspect of the invention there is provided a method of generating a model of a mine in which a plurality of equipment units are deployed for the extraction of at least one resource from the mine, the method comprising:

a) receiving data from a first plurality of heterogeneous sensors in the mine;

b) fusing the data into an in-ground model descriptive of the mine and the at least one resource;

c) receiving equipment data relating to the plurality of equipment units deployed in the mine;

d) combining the equipment data into an equipment model;

e) receiving data from a second plurality of sensors;

f) fusing the data into an out-of-ground model descriptive of material extracted from the mine, wherein at least one of the equipment units operates to extract the at least one resource from the resource; and g) communicating information from at least one of the in-ground model, the equipment model and the out-of-ground model to the equipment units for use in controlling operation of the equipment units in the mine.

According to a further aspect of the invention there is provided a method for managing an out-of-ground material within a mine, the method comprising:

storing data relating to a geometry and a geology of an in-ground material within said mine;

updating said data using input from at least one operation unit once said in-ground material has been excavated and corresponds to said out-of-ground material; and tracking a movement of said out-of-ground material within said mine from excavation to stock-piling.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
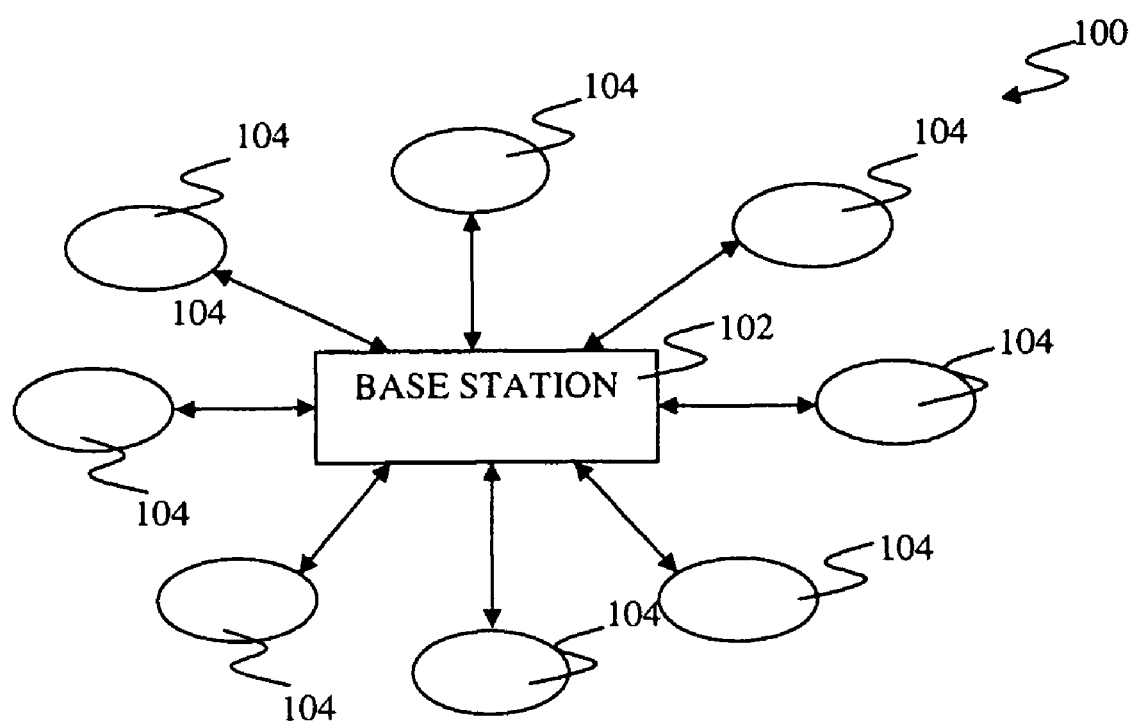
FIG. 1 is a block diagram of a Mining Picture Compilation system, according to an embodiment.

The present invention relates to the exploitation of information from heterogeneous sources relating to a defined environment and the generation of a model for use in the extraction of resources from the defined environment. The embodiment illustrated in the Figures and described in most detail is an application to mining. It will be appreciated that there are many other fields of application relevant to this invention, including forestry and agriculture.

The term "fusing" refers in this description to combining information from multiple sources to create a data model or combining new information with already existing information of a data model to update this data model. The multiple sources can be either homogeneous or heterogeneous sources. The information from the multiple sources typically has different characteristics, for example the accuracy of the data, but provides information about the same measured parameters, for example coordinates describing the position of an object. One reason for fusing information from heterogeneous sources, for example multiple sensors, is to improve the accuracy of the value(s) estimated from the measured values. The fusion of information can also refer to updating old information with new information, for example, replacing a location of a vehicle by its new position. The fusion of information may make use of fusion algorithms.

In the mining application, the term "in-ground information" refers to geometrical, geophysical and geological information about in-ground material, along with information about mining activities that have occurred or are to occur prior to the extraction of the material. The in-ground or unexcavated material is material that has not been excavated yet. Geometrical information represents information about the location and the geometry of the mine, benches, etc. It also includes information about the location of existing or to-be-drilled holes and their dimensions. This constitutes a drill pattern. Furthermore, geometrical information can also include associated information relating to quantity and composition of explosives to be provided in the holes. Using the in-ground information, it is possible to estimate quantity and stocks of in-ground material. In-ground information also comprises chemical and mechanical properties of the different zones of the mine. All in-ground information is fused to form an in-ground model.

In an agricultural application the term "in ground information" may relate to the soil and economically useful plants or crops in a region of interest. The in-ground model obtains, through sensing, an integrated picture of the geometry, chemical composition, and crop health over the required area. More generally, the term "in-ground information" falls into the class of "pre-extraction", "pre-intervention" or "pre-processing" information and refers to information describing a region at some starting reference point, or a relative starting reference point within a dynamic process subject to continual re-evaluation. The region resource may be, for example, a mine, an agricultural resource or a forestry resource that is subject to intervention or processing by the equipment referred to below. In this broader sense the "in-ground information" is not limited literally to information relating to the ground, but may, for example refer to a marine resource.

In this description a second type of information is termed "out-of-ground information". In the mining application the "out-of-ground information" refers to information about the extracted or out-of ground material including stockpiles and material in process. This information includes, but is not limited to, geophysical, chemical and grade of the out-of-ground material in addition to its location within the mine. Using the out-of-ground information, it is possible to estimate the stocks and quantity of out-of-ground material. The out-of-ground information is fused to form an out-of-ground model.

In an agricultural application the out-of-ground information may, for example, describe a harvested crop. More generally, the out-of-ground information falls into the class of "post-extraction", "post-processing" or "post-intervention" information that describes material extracted or harvested from the environment described by the in-ground (pre-extraction) information. In some applications the out-of-ground label does not related literally to the ground, but may, for example, have reference to a marine resource.

The expression "equipment information" refers to information relating to the pieces of equipment used in a resource-processing application. The equipment is instrumental in transferring material from the in-ground or pre-processing environment to the out-of-ground or post-processing environment. In the context of a mining operation, for example, "equipment information" refers to information relating to the pieces of equipment used in a mine and to its operators. The equipment information includes, but is not limited to, the number, the location, the status, the disposition, and the type of the piece of equipment. It also includes scheduling and logistic information. All equipment information is fused to form an equipment model.

The term "automatic" refers to a system or process that executes a specific well-defined task that is often narrowly defined. "Automatic" implies following a set of well-defined rules and reacting in a defined way to a defined stimulus. "Automated systems" are those that have some automatic components or properties.

The term "autonomous" refers to systems that are more complex as the systems are able to respond to unknown stimuli and can function without a complete knowledge of their environments. Typically, an autonomous system does not require human intervention to respond to at least some unpredicted changes in its environment.

The three models relating to in-ground, out-of-ground, and equipment information, may be used to form an overall integrated picture for use in monitoring and exploiting an environment such as a mine. The models may also be applied to the fusion of information for estimation in forestry and agriculture applications, for example the fusion of in-ground information such as soil properties with out-of-ground information such as crop or harvest data. The equipment or operation units in this example might include tractors, ploughs and other agricultural equipment.

In a similar manner, fusion of in-ground information may also be used for drainage or irrigation applications. Further applications may also include the fusion of information for estimating properties of the ocean or other liquid bodies. Maritime examples include the use of the in-ground model to estimate properties such as ocean temperature and salinity. "Out-of-ground" type estimates may relate to any marine resource including fish or minerals extracted from the ocean, and equipment and operation units may include items such as fishing boats. In marine applications the equipment may, for example, include fishing vessels and submarines, and the "in-ground" model may, for example, include sonar modelling.

One realisation of the post-processing, or out-of-ground, and equipment models may use a Kalman filter, information filter or particle filter for information fusion. However, any other fusion algorithm may also be applicable.

1 System Overview

FIG. 1 illustrates an embodiment of a system for exploiting information from heterogeneous sources in the operation of a mine. This system is referred to as the MPC (Mining Picture Compilation) system 100. A base station 102 is connected to multiple operation units 104. Examples of operation units 104 are pieces of equipment used to exploit the mine such as shovels, drills, and trucks and also units or modules used to control and/or automate these pieces of equipment. Base station 102 contains information about the mine and acts as a resource and information centre accessible by operation units 104. Base station 102 can also send commands and instructions to operation units 104. Base station 102 and multiple operation units 104 exchange information useful for the exploitation of the mine and base station 102 updates its own information by compiling the newly received information with the old information during the exploitation of the mine. For the purpose of this description, the exchanged information is divided into three types of information, namely, in-ground, out-of-ground and equipment information.

In one arrangement, the base station comprises a processor, memory and communication means to receive and transmit data. An application is executed by the processor and is configured to maintain three models, namely, the in-ground, out-of-ground and equipment models. The in-ground model fuses all in-ground information and describes the in-ground geometry and geology to the point of excavation by maintaining a multi-scale probabilistic representation of the geology, geophysics and geometry of the mine. The out-of-ground model fuses all out-of-ground information and describes resources in transit, in process plant and in stock-pile. The equipment model fuses all equipment information and describes the disposition and status of all equipment resources including operators, for example. The disposition of the equipment resource indicates where a given resource is located while the status indicates if the equipment is in use or not. The equipment model further enables the coordination of the equipment resources, and the scheduling and logistics. These are described in detail below. These three models are realised in three model units which are connected together in order to exchange information.

In one arrangement each model unit may have a processor, memory, communication means and an application related to the processor. Each application is configured to perform the tasks required for each model unit, respectively. The three model units can share a same and single communication means. In another arrangement the model units may be applications running on a single processor.

Figure 2:
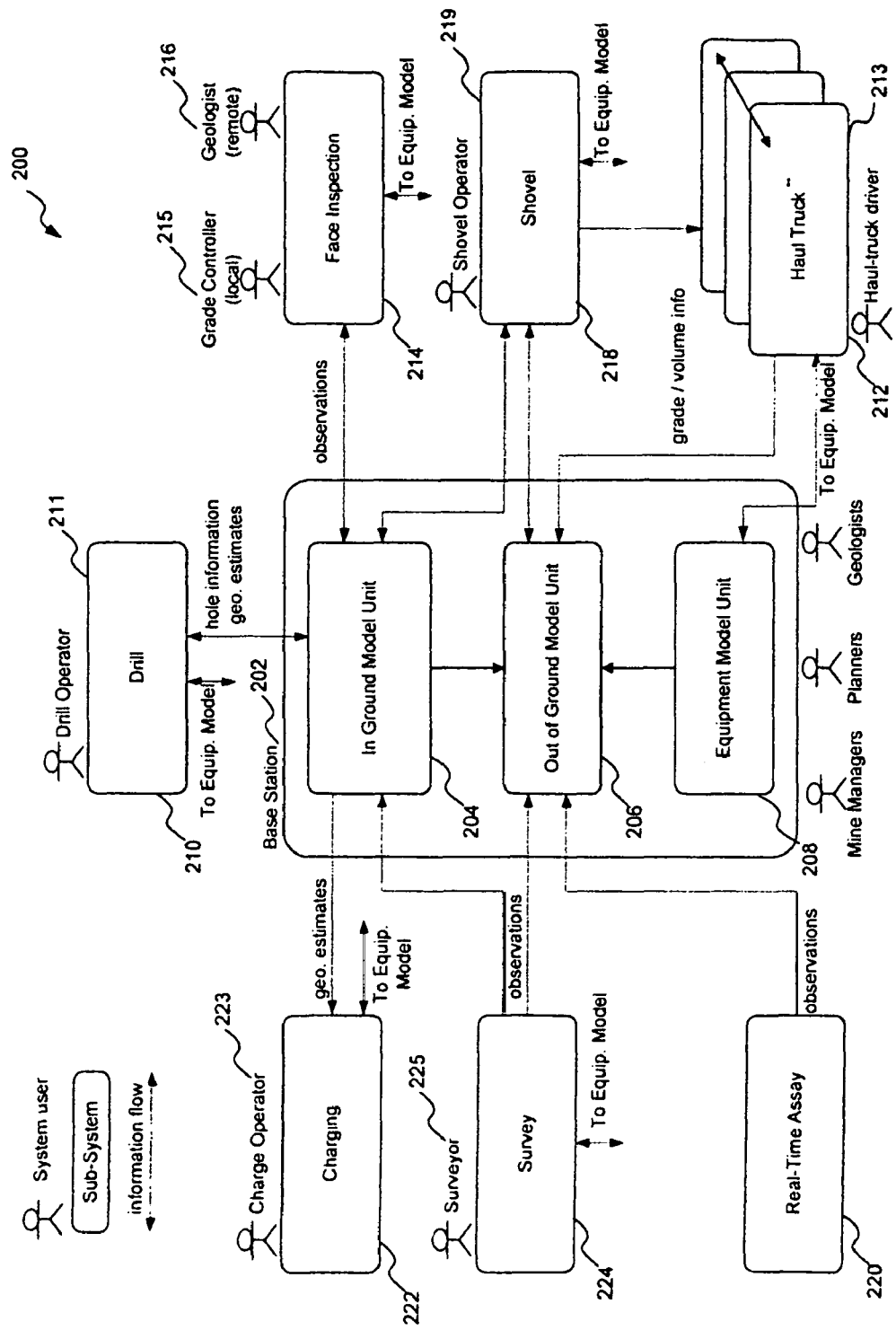
FIG. 2 is a block diagram illustrating a base station connected to seven operating units, in accordance with an embodiment.

FIG. 2 illustrates one embodiment of a Mining Picture Compilation, MPC, system 200 used for the exploitation of a mine in which a base station 202 includes an in-ground model unit 204, an out-of-ground model unit 206 and an equipment model unit 208. The base station is connected to seven operation units, namely, a drill automation unit 210, a truck automation unit 212, a face inspection unit 214, a shovel automation unit 218, a real-time assay unit 220, an automated charging unit 222, and an autonomous real-time survey unit 224.

In the MPC system 200 the haul truck automation unit 212 is in peer to peer communication with the equipment model unit 208.

The operation units may operate autonomously and/or may have one or more corresponding operators. The drill automation unit 210 has a drill operator 211; the truck automation unit 212 has at least one haul truck driver 213; the face inspection unit 214 has a local grade controller 215 and a remote geologist 216 associated with it; the shovel automation unit 218 has a shovel operator 219; the automated charging unit 222 has a charge operator 223; and the autonomous real-time survey unit 224 has a surveyor 225.

While FIG. 2 illustrates one operation unit of each type connected with the base station, it should be understood that the base station can be connected to more than one operation unit of each type.

In one embodiment, the in-ground model unit 204 exchanges information with the drill automation unit 210, the face inspection unit 214, and the shovel automation unit 216, it also sends in-ground information to the automated charging unit 220 and the autonomous real-time survey unit 222. The out-of-ground model unit 206 exchanges information with the shovel automation unit 216 and receives out-of-ground information from the truck automation unit 212 and the autonomous real-time survey unit 222. The equipment model unit 208 exchanges information with all of the operation units.

The three model units receive information from the seven operation units and return upon request fused and updated information to the seven operation units. Each operation unit can communicate directly with each model unit via peer-to-peer communication. Alternatively, the exchange of information between the model units and the operation units can be realized via a server. Communication between the operation units is also possible either via a server or via peer-to-peer communication.

It should be understood that the base station may only have a single model unit adapted to perform the tasks allocated to the in-ground model unit, the out-of-ground model unit and the equipment model unit.

2 Base Station

The base station, including the in-ground model unit, the out-of-ground model unit and the equipment model unit, can be implemented with the aid of appropriate computer hardware and software in the form of a computing system such as a server. The server comprises suitable components necessary to receive, store and execute appropriate computer instructions. The components may include a processing unit, memory, storage and an input-output interface. Standard computing hardware will also include a bus for communication amongst hardware components. One example of a suitable system is the Dell PowerEdge M600 server, which may be housed in a Dell PowerEdge M1000e enclosure.

Communication amongst the software-implemented units (the in-ground model unit, the out-of-ground model unit and the equipment model unit) can be implemented in software running on the same hardware.

2.1 In-ground Model Unit

Figure 3:
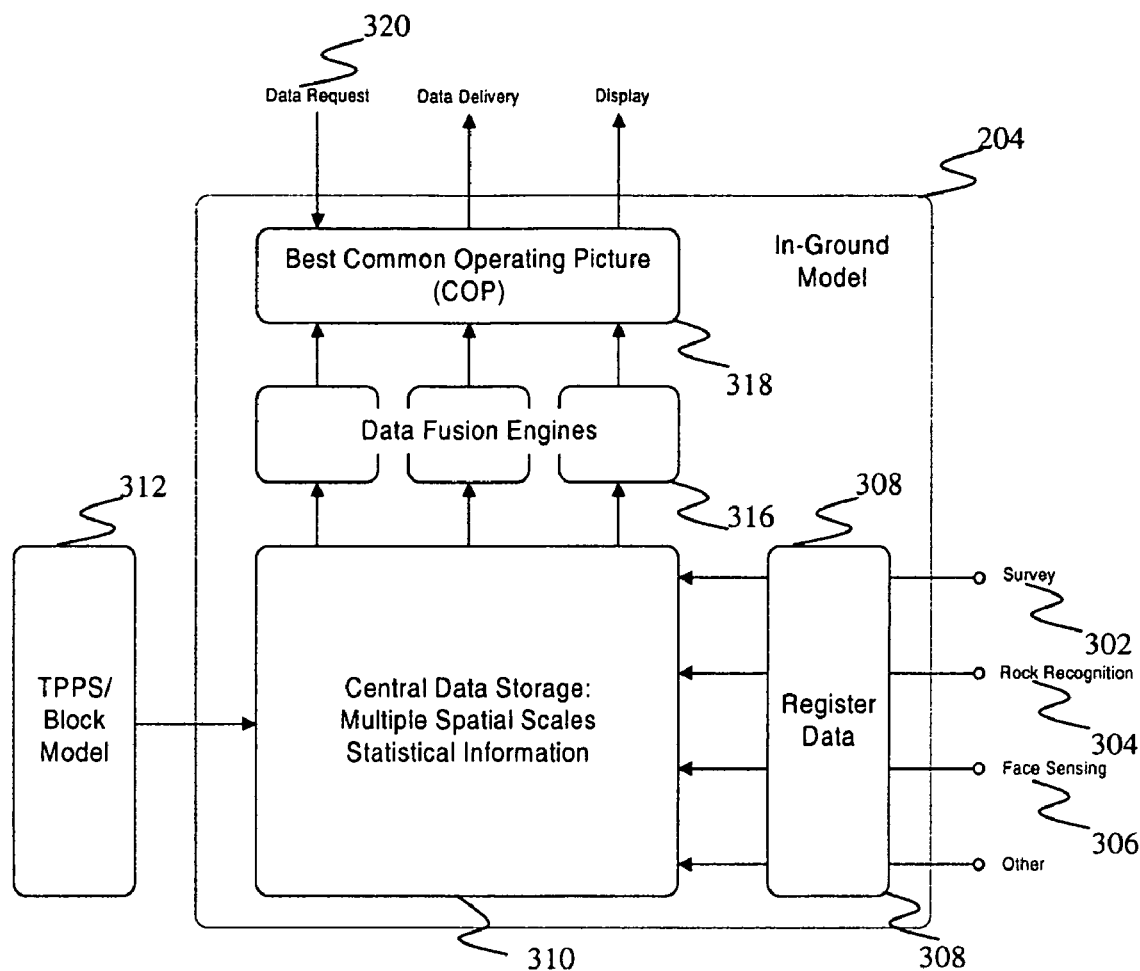
FIG. 3 illustrates the operation of an in-ground model unit, according to an embodiment.

FIG. 3 illustrates the operation of an in-ground model unit 204, according to one embodiment. The in-ground model unit 204 is responsible for maintaining and updating a multi-scale probabilistic representation of the geometry and geology of the in-ground material. Examples of elements included in the in-ground model are geometric properties (such as walls, benches, etc), hole positions and drill patterns, geological information such as disposition of shale, ore zones, chemical composition, and mechanical properties of these zones such as rock factors, hardness, etc.

The in-ground model unit 204 is responsible for integrating survey information 302, rock recognition information 304, face inspection information 306, and other information such as information from chemical assays and information about exploration holes, in order to better model and predict the geometry and geology of material in the ground. This information is spatially heterogeneous at many scales and is therefore uncertain. The in-ground model is maintained centrally and is distributed to operation units for the purpose of control and optimal operation. The in-ground model unit 204 is responsible for spatially registering new in-ground information using the position, orientation and status of equipment generating the new information. This is done in the register data module 308. The in-ground model unit 204 is also responsible for fusing new in-ground information and equipment information to know the location of the piece of equipment that sends the in-ground information into an existing geological block model to improve the geology prediction. The equipment information is input to the in-ground model unit from either the equipment model unit 208, or directly from the equipment (operation units) deployed in the system. Through the in-ground model, mine geology can be predicted and updated as new information becomes available.

In one embodiment, the in-ground model unit 204 uses data fusion algorithms to propagate the influence of an observation or a measurement to the rest of the geological model.

In one embodiment, in-ground information data is registered in a common coordinate frame. The architecture allows for any number of data sources to be registered and exploited in the in-ground model unit 204. Registration uses both absolute information from a GPS (Global Positioning System) as well as data-to-map association. Registered information is stored in the central data storage 310, and is characterised by multiple spatial scales and contains statistical information associated with registration errors and sensor source inaccuracies.

In one embodiment, registration also includes a method of data validation or data integrity monitoring in order to protect against incorrect information being assimilated. Information from an external database 312, which can include an existent, deterministic, TPPS (Total Production Planning System) data base and geological block models, can also be input into the in-ground model. The single common data base 310 contains raw data at all spatial scales and includes all probabilistic (statistical) information associated with the data. For example, the common data base 310 can be based on a KD spatial tree, which is a method for modelling spatial data at multiple scales.

The data fusion engines 316 have as inputs the sensor data from the register data module 308 and the TPPS and block model data via the central data storage 310. The fusion operation is performed in the data fusion engines 316.

The output of the fusion operation is known as the common operating picture (COP) 318 and represents an estimate of all spatial and geological properties based on the combined evidence from all sources of information. Different fusion algorithms and methods are used for different types of estimates. For example, spatial estimates for geological structures can require the use of a Gaussian Process model which describes spatial correlations in data; surface models can be obtained from irregular spatial tessellations; and geological class information from a discrete classifier.

In one embodiment, the COP 318 contains an estimate of quantitative geometric, geological and geophysical properties, qualified with statistical confidence bounds. This information can be accessed through specific data requests 320 from any other service providers in the mines and other units such as operation units, the out-of-ground unit 206 and the equipment unit 208. Service providers may include, but are not limited to, automated or autonomous machines, such as drill rigs, that require information for the purpose of control and optimal operation; individual decision makers, such as planners, who require this information to plan mining operations; or for display at local or remote sites. Different types of requests are supported including those in restricted spatial areas or those for which data is required in real or near-real time.

In one embodiment, the in-ground model unit 204 is configured to perform the following tasks:
- Register geological and geometric information from multiple sources
- Represent and store data at multiple spatial scales
- Represent and store probabilistic measures on data
- Fuse data to form a single integrated spatial model with uncertainty measures
- Fuse data to form a single integrated geological model with uncertainty measures
- Output information on request to other sources including displays and in-field equipment.

In this embodiment, the in-ground model unit 204 has certain performance parameters. The relevant performance parameters are constraints and qualities of the system. They describe how well the system is required to perform its functionality.

Qualities capture required properties of a system, such as performance. They can be subdivided into run-time qualities and development-time qualities. The former relate to the end-user goals and include usability, configurability, correctness, reliability, performance (e.g. throughput, response time, latency, bandwidth), safety properties and operational scalability. Development-time qualities are properties of the artefacts of the development process which are important to the development organization. Artefacts comprise the system architecture, system design and program code. Examples of development-time quality requirements are modifiability, extensibility, evolvability, composability and reusability.

A constraint is a condition or restriction that is imposed on a system. Constraints are not subject to negotiation, and unlike qualities, are not included in any design trade-off analyses. Examples of common constraints include the mandated use of specific standards or development processes within an organisation.

Figure 4:
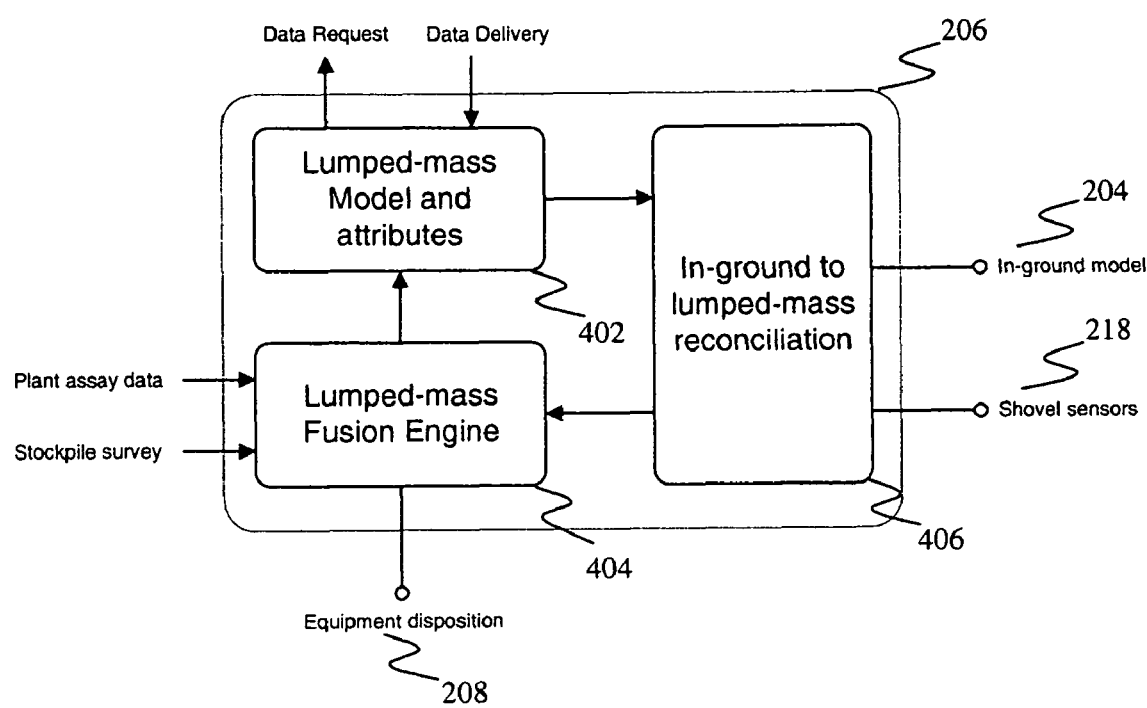
FIG. 4 illustrates the operation of an out-of-ground model unit, according to an embodiment.

In one example, the in-ground model unit 204 has the following performance parameters:
- Registration <10 cm, 0.1 degree on each sensor
- Mine-wide absolute resolution <0.5 m
- Bench absolute resolution <0.2 m
- Spatial error model >95% accurate
- Geology classes <20
- Classification success >95%
- Parameter training <12 hours
- Inference <5 s
- Display: video rate
- Remote access to data on 30 m×30 m area <2 s 2.2 Out-of-ground Model Unit FIG. 4 illustrates the operation of the out-of-ground model unit 206, according to one embodiment. The out-of-ground model unit 206 is operatively connected to the in-ground model unit 204, the equipment model unit 208, the autonomous real-time survey unit 224, the real-time assay unit 220, the truck automation unit 212, and the shovel automation unit 218. It should be understood that the out-of-ground unit 206 can also be connected to service providers and other operation units.

In one embodiment, the out-of-ground model unit 206 reconciles information about material as it is excavated, transported and stockpiled, with the in-ground model estimates coming from the in-ground model unit 204. In the in-ground to lumped-mass reconciliation module 406, the out-of-ground model unit 206 fuses information from the in-ground model and equipment model to know the location of shovels, trucks etc. that send the out-of-ground information with data from shovel sensors to estimate quantity and grade during material removal from the face. This information is propagated during haulage and reconciled, in the lumped-mass fusion engine 404, with observations made by material flow measurements and assays in the plant, and further reconciled with post-plant stockpile surveys. The out-of-ground model unit 206 includes a lumped mass model 402 with associated geophysical and chemical attributes. The mass model can be tied to the point of excavation for use in post-mining refinement of the resource model. The out-of-ground model unit 206 can estimate on request the location and grade of all available stock in the mine. Unexcavated broken stock is considered to be part of the in-ground model.

The out-of-ground model conserves mass and attributes as material flows through the system from bench to train. Each step in the process involves measurements which identify local flow characteristics. These measurements are fused to reconcile material conservation.

The out-of-ground model describes flow from in-ground to stockpile reclaiming. The model conserves mass and attributes as material flows through the system from bench to train. Each step in the process involves measurements which identify local flow characteristics. These measurements need to be fused to reconcile material conservation. The out-of-ground model unit 206 is connected to the equipment model unit 208 so that the out-of-ground model is available for material management and scheduling performed by the equipment model unit 208.

In one embodiment, the out-of-ground model unit 206 is configured to perform the following tasks:
- Register and fuse shovel sensor data with in-ground model;
- Estimate lumped mass model and attributes in bucket;
- Estimate lumped mass model and attributes in truck;
- Track lumped mass model in plant and fuse with mass and chemical measurements from plant;
- Track lumped mass model and attributes to stockpile and fuse with survey data; and
- Generate lumped mass stock data on demand.

In one example, the out-of-ground model unit 206 has the following performance parameters:
- In-ground to shovel mass reconciliation <2%;
- Shovel to truck reconciliation <2%;
- Truck to plant reconciliation <2%;
- Stockpile back to in-ground reconciliation <5% on mass, <2% on geophysical and chemical; and
- Data available in <1 s.

2.3 Equipment Model Unit

Figure 5:
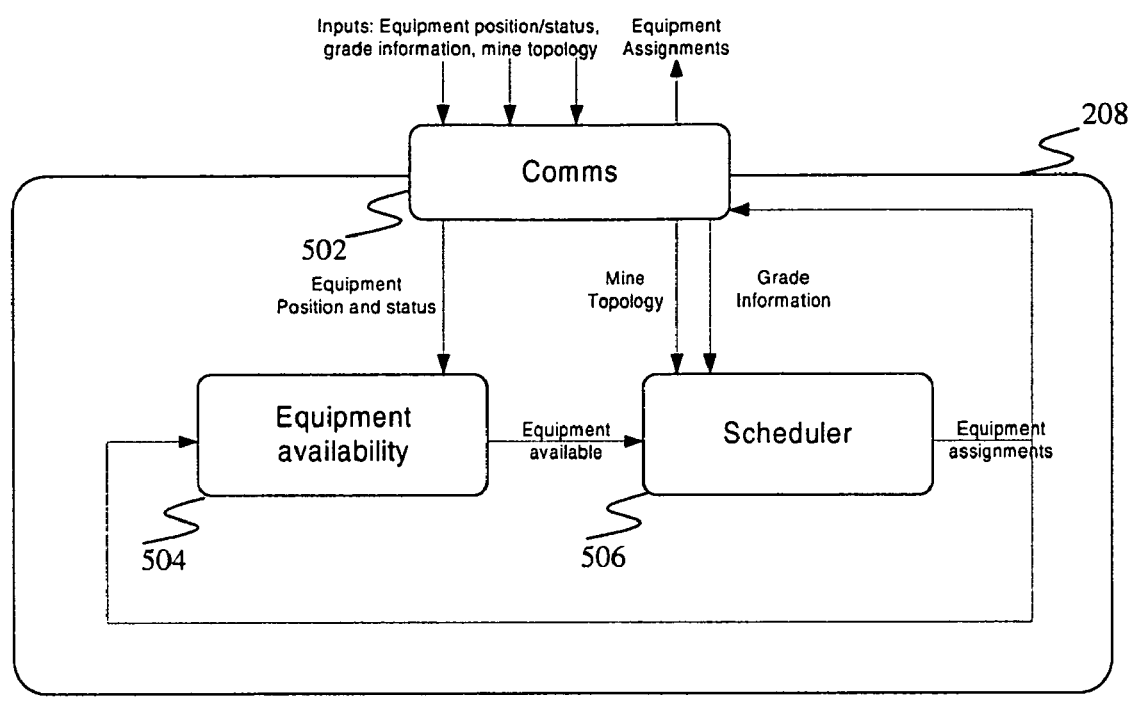
FIG. 5 illustrates the operation of the equipment model unit, according to an embodiment.

FIG. 5 illustrates the operation of the equipment model unit 208, according to one embodiment. The equipment model unit 208 maintains and updates information related to equipment location, disposition and scheduling. This information may be made available through existing dispatch systems for trucks, shovels and other pieces of equipment. The equipment model provides an interface 502 through which information can be exchanged between these existing systems and the MPC system and in particular to enable the out-of-ground model unit 208 to reconcile material models at the bench with material flows through the plant. The equipment model unit 208 receives equipment position, disposition and status, from which equipment availability is determined in module 504. The equipment availability information, together with mine topology and grade information, is used by the scheduler 506 to determine equipment assignments. This information is in turn fed back into the equipment availability module 504, and communicated to the equipment via communication interface 502. The equipment model may be updated with information from an external dispatcher.

In one embodiment, the equipment model unit 208 is configured to perform the following tasks:
Provide an interface to existing dispatch systems for trucks and shovels;
Provide an interface to proprietary truck or shovel load sensing; and
Provide an interface to any equipment docking sensors.

In one example, the equipment model unit 208 has the following performance parameters:
Position data from trucks and shovels to ensure one-to-one correspondence between equipment movements; and
Time information <1 s.

Referring back to FIG. 2, the base station 202 is connected to seven operation units. The tasks of these units is to send in-ground, out-of-ground, and equipment information to the base station 202 and also to control and/or automate pieces of equipment such as drills, trucks, shovels, etc.

3 Operation Units

The automation functionality in the operation units may be implemented using appropriate computer hardware and software. Software that needs to be run on units in harsh conditions, for example in a mine, may be run on an embedded computer that has a mounted power supply, the embedded computer comprising suitable components necessary to receive, store and execute appropriate computer instructions. The components may include a processing unit, memory, storage and an input-output interface. One example of a suitable system is the Ampro LittleBoard™800 single board computer provided by Ampro Computers, Inc of San Jose, Calif. If the automation units are deployed in harsh conditions, the computer system may be housed in a protective enclosure.

Communication between units, and between the operation units and the base station may be implemented using a wireless communication system that supports bidirectional communication.

3.1 Drill Automation Unit

In one embodiment, the drill automation unit 210 is divided into two units:
1. the auto drilling unit 210 (FIG. 6) used to control the drilling process of a drill and
2. the auto tramming unit 702 (FIG. 7) used to position the drill.

Figure 6:
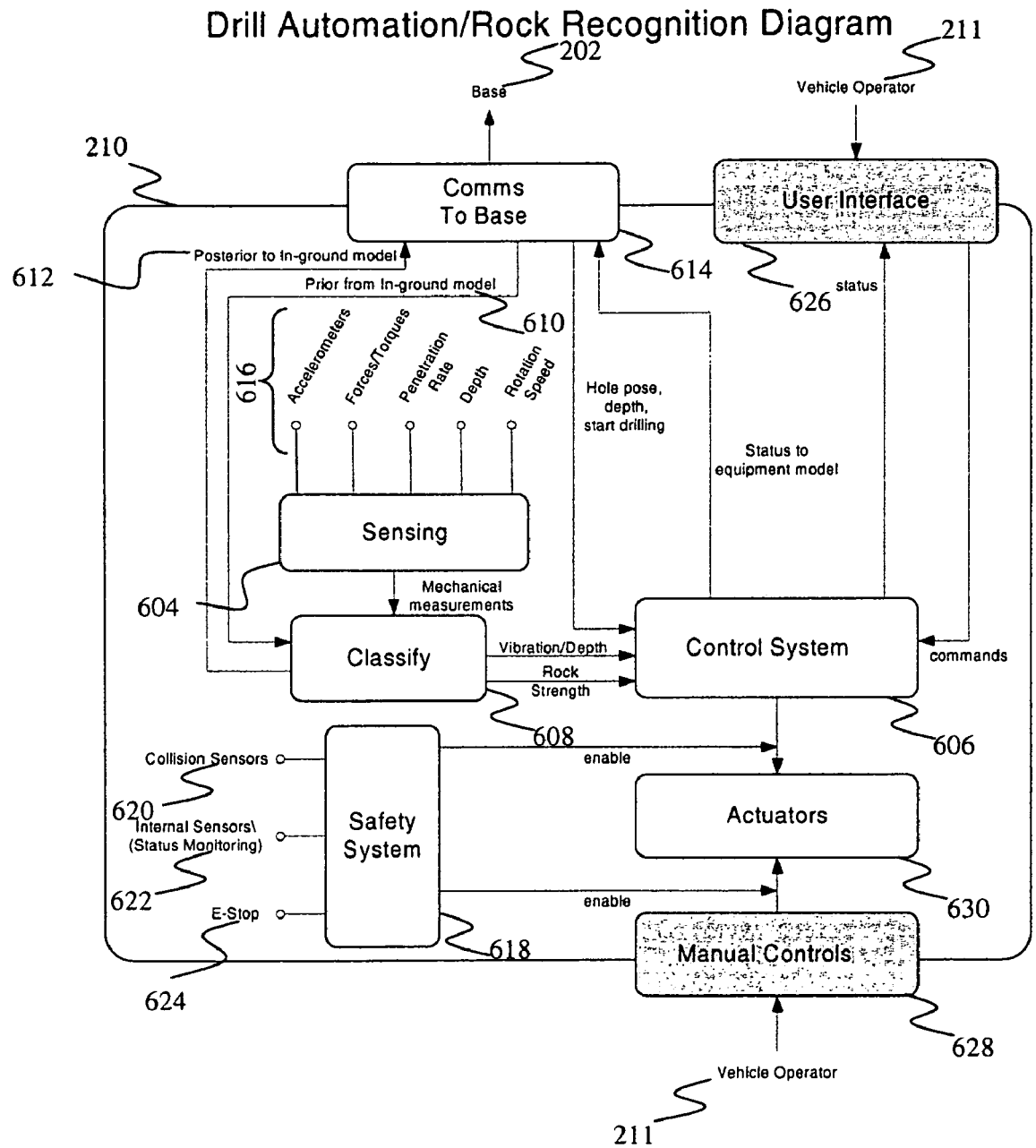
FIG. 6 illustrates the operation of an auto drilling unit, according to an embodiment.

FIG. 6 illustrates the operation of an auto drilling unit 210, according to one embodiment. The auto drilling unit receives information from control sensors 604 of its associate drill, such as rotation speed and pull-down pressure. The auto drilling unit provides information on geological and geophysical rock properties on the bench at the point where a blast hole is drilled. This information is exploited through two routes:

1—A direct route for controlling the drilling process itself. In drilling, real-time rock property estimation is used to control drilling mode, drill advance and other control properties of the drill. This is an immediate function and there is no explicit geological model constructed. The drill control system 606 adjusts rotation speed and penetration rate according to the hardness of the material. This can be a full control system for autonomous operation. Partial control is also possible to automate certain actions if an operator is present, e.g. autonomous position at the drill.

2—An indirect route for updating the in-ground model. A classifier 608 is trained for rock recognition and uses prior information 610 from the in-ground model to improve classification accuracy. The prior information 610 combined with local information from the classifier yields a posterior 612. This posterior is then sent to the in-ground model where it is fused with the geological model. In contrast, the use and fusion of drilling information in the in-ground model is used to refine the geological and geophysical characterisation of the local bench.

One method that the classifier 608 may use to generate the posterior used for fusing the in-ground model is a Gaussian Process, an example of which is discussed below with reference to FIGS. 14-17.

In one embodiment, an operator 211 is required and the auto drilling unit 210 is operated in an operator assist mode. The system provides real-time analysis of the hardness of the rock being drilled, and an operator is responsible for controlling the drill. Manual vehicle controls are mechanically connected to the vehicle or connected through drive-by-wire. User interaction overrides autonomous control.

In another embodiment, the auto drilling unit is entirely autonomous. In the autonomous mode, a controller uses hardness to optimise rotational speeds and penetration rates. In this mode, down-hole sensing including natural gamma and in-situ chemical assays can be used. The fusion process occurs in the in-ground model unit. The output of the COP system at the local bench can be exploited by the drill itself in determining subsequent hole layout, in the charging process for determining the loading of explosives, and in the refinement of geological strata in adjacent future production areas.

Referring to FIG. 6, the communication unit 614 exchanges information with the base station 202. The drill receives prior information 610 from the in-ground model about the geology of the current area to be drilled. During drilling, sensors 616 such as accelerometers, tachometers, pressure transducers and torque sensors, for example, are used to classify rocks in terms of rock factors (such as hardness and fragmentation) and geology. The prior 610 combined with local observations from sensor inputs 616 yields a posterior 612. This posterior 612 is a local estimator of the geology and hardness of the rocks. This posterior 612 is sent to the in-ground model unit 204 where it is fused with posteriors from the nearby region to produce a final classification. The geological model is then updated in the in-ground model unit 204 by fusing the new information.

A drill pattern is sent to the auto drilling unit 210 by the in-ground model unit 204 and includes relevant information about the position and depth of the holes, and the geometry of the bench. Once the auto tramming unit 702 has placed the drill over a hole location, drilling starts using the specified depth and angular information. The low-level control is implemented in a control system sub-unit 606 which receives hardness information from the classifier 608 and controls penetration rates and rotation speeds.

In one embodiment, a safety system sub-unit 618 is responsible for fault detection and emergency actions. This unit 618 includes sensors such as collision sensors 620 and internal status monitoring sensors 622 and an emergency stop 624.

In the operator assist mode, two additional sub-units, namely the user interface sub-unit 626 and the manual controls 628, are provided. The user interface sub-unit 626 possesses a display with the drill pattern, drill pose and parameters of holes (depth and angle). The display also shows real-time classification of the rocks in terms of hardness. The operator 211 can use this to modify penetration rate and rotation speed if necessary. The manual controls sub-unit 628 provides direct access to the actuators 630 of the machine. This is provided in case of an emergency or unpredictable situations.

In one embodiment, the auto drilling unit 210 is configured to perform the following tasks:

Automatic selection of drill mode;
Automatic adjustment of rotation speed and penetration rate;
Recognition of rock properties such as rock factor and hardness;
Recognition of geology (Iron ore zones, shale, Banded Iron Formation (BIF), etc);
Performing chemical analysis in borehole;
Exporting rock recognition data to in-ground model; and
Importing in-ground model data for drill control.

In one example, the auto drilling unit 210 has the following performance parameters:

Positioning accuracy <10 cm;
Depth accuracy <10 cm;
Respect vibration and environmental constraints of the machine;
Rock factor classification <10%;
Spatial resolution of strata <10 cm;
Geology classification error <10%;
Chemical analysis <1% error;
Hole characteristics up load to in-ground model <5 s; and
Bench characteristics down load from in-ground model <2 s.

Figure 7:
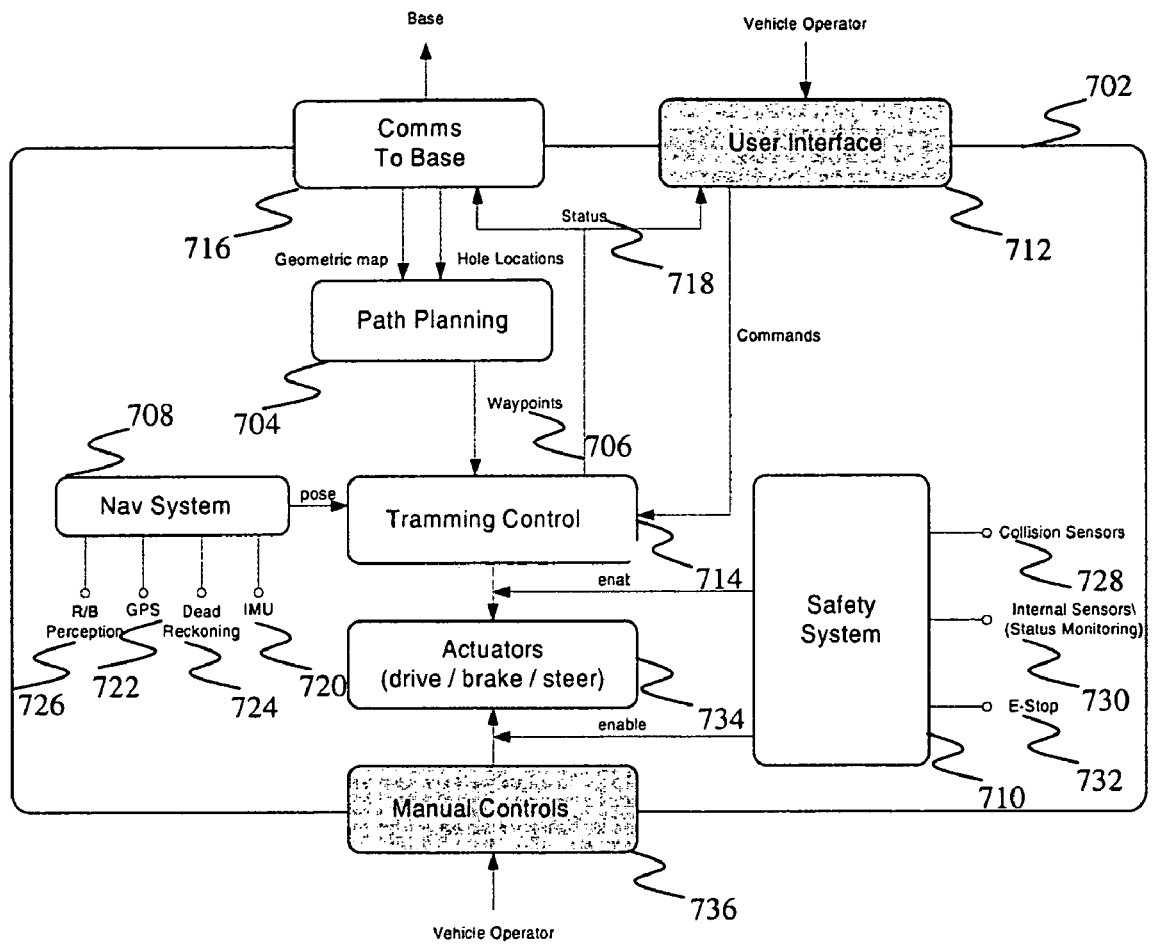
FIG. 7 illustrates the operation of an auto tramming unit, according to an embodiment.

FIG. 7 illustrates the operation of an auto tramming unit 702, according to one embodiment. For drill automation, the auto tramming unit 702 automatically trams and positions the drill over required hole locations specified in the drill pattern. The drill pattern and the bench geometry are transmitted to the drill automation unit 210 from the in-ground model unit 204. The auto tramming unit 702 comprises a path planning component 704 to automatically determine an optimised drill trajectory (indicated by waypoints 706) over the bench and a navigation system 708 responsible for the localisation of the drill. The navigation system fuses navigation sensor information to provide vehicle pose, where the pose includes position, velocity and attitude (PVA).

In one embodiment, the auto tramming unit 702 includes a safety system 710 for monitoring the status of the drill and detecting possible collisions or other anomalies.

The auto tramming unit 702 can be operated in two operational modes. In the operator-aided mode, a user interface 712 informs the operator 211 of the path and the current position of the drill and the operator 211 is responsible for confirming drill positions. In the fully autonomous mode, a tramming controller 714 receives the low-level decisions, providing an interface between the path planner and the navigation system. When a full control system is used for autonomous operation, no operator intervention is required and the status of the drill is monitored remotely. Partial control is also possible to automate certain actions if an operator is present, e.g. for the autonomous positioning at a drill. The auto tramming unit 702 is designed to operate in conjunction with the auto drilling unit 210 in a fully autonomous drilling solution. These two units communicate and the drilling mode is activated when the drill reaches a specific hole location.

As illustrated in FIG. 7, the communication sub-unit 716 exchanges information with the central in-ground model unit 204 and the equipment model unit 208. The drill sends the current drill status 718, including position, speed and intended trajectory to the equipment model, for example. The equipment model unit 208 uses the intended trajectory to accommodate other pieces of equipment and operation units operating in the same area. As holes are drilled, the drill automation unit 210 updates the in-ground model unit 204 with an updated map of the actual hole location and depth.

A path planning sub-unit 704 generates a set of waypoints 706 representing the trajectory of the drill. It obtains a geometric bench model and desired drill pattern from the in-ground model and generates a drill sequence and trajectory.

The auto tramming unit 702 comprises a drill navigation system 708 which can be similar to other vehicle navigation systems (for example, for a truck automation unit 212). It is responsible for fusing data from positional sensors for the accurate localisation of the drill. Positional sensors may include an inertial measurement unit (IMU) 720, a GPS 722, dead reckoning sensors 724 such as wheel encoders, higher-level perception sensors 726 based on laser scanners, etc. The use of redundant sensors enables integrity requirements.

In one embodiment, the auto tramming unit 702 further comprises a safety system sub-unit 710 responsible for fault detection and emergency actions. This sub-unit includes collision sensors 728, internal status monitoring sensors 730 and an emergency stop 732. It should be understood that the auto drilling unit 210 and the auto tramming unit 702 can share a single and same safety system sub-unit (618 and 710).

The low-level control is implemented in a tramming control sub-unit 714. This sub-unit receives waypoints 706 from a path planning sub-unit 704 and poses estimates from the navigation system 708. These estimates are used to control the vehicle actuators 734.

In the operator-aided mode, the auto tramming unit 702 further comprises a user interface sub-unit 712 and a manual control sub-unit 736. Manual vehicle controls are mechanically connected to the vehicle or connected through drive-by-wire. User interaction overrides autonomous control. The user interface sub-unit 712 is implemented as a display with the drill pattern, drill pose and intended trajectory of the machine. The manual controls sub-unit 736 provides direct access to the actuators 734 of the machine.

It should be understood that the user interface sub-unit 712 (and 626) and the manual controls sub-unit 736 (and 628) of both the auto drilling 210 and auto tramming units 702 could be combined in a single interface sub-unit and manual controls sub-unit. Alternatively, the auto drilling unit 210 and the auto tramming unit 702 can be regrouped into a single unit.

In one embodiment, the auto tramming unit 702 performs the following tasks:

Path planning and optimisation;
Autonomous trajectory control on bench;
Final position and pose control; and
Detection of potential collisions.

In one example, the auto tramming unit 702 has the following performance parameters:

Final positioning accuracy <10 cm, pose accuracy <0.5°;
In-path position accuracy <40 cm, heading accuracy <2°;
Position integrity during autonomous motion 100%;
Avoid collisions >40 cm rocks, all humans and machinery; and
Avoid negative obstacles >50 cm (negative obstacles are defined as areas of dangerous free space such as the edge of a pit).

3.2 Truck Automation Unit

Figure 8:
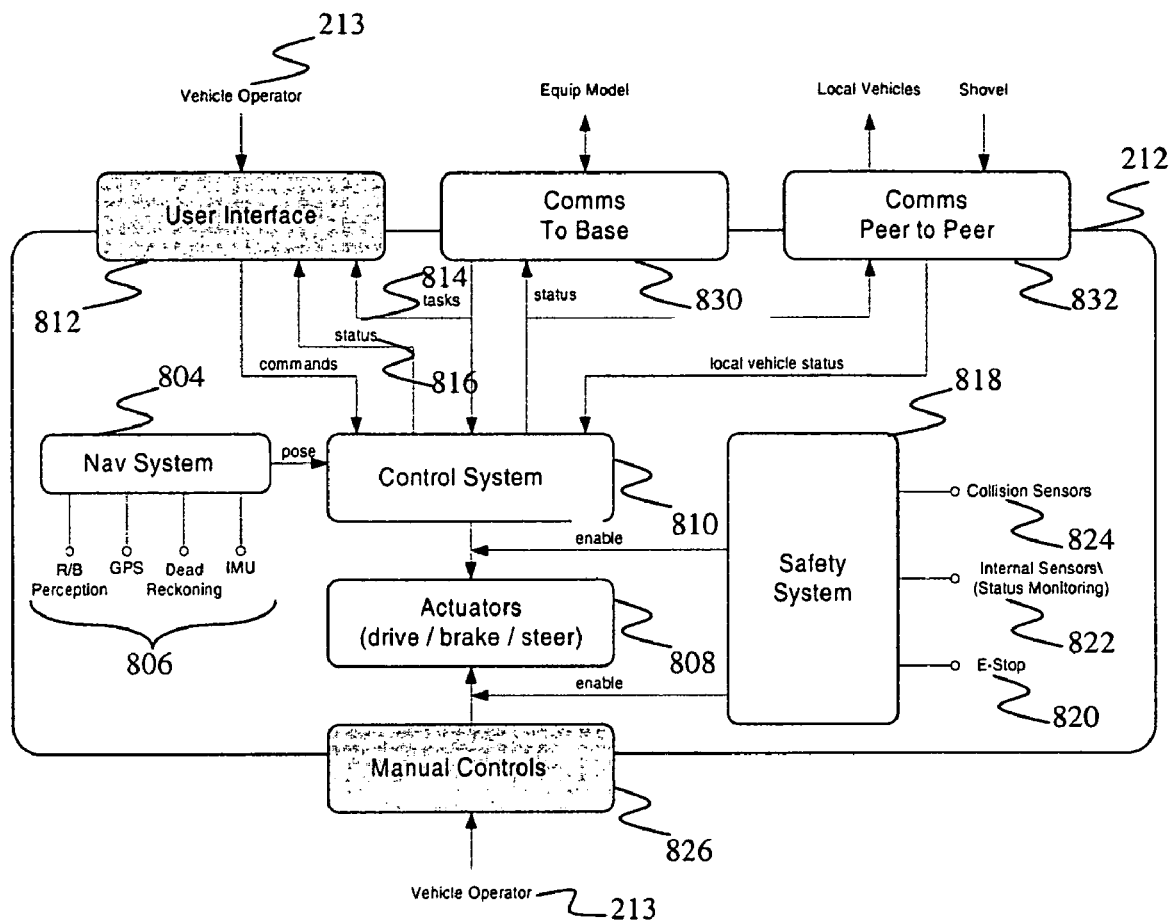
FIG. 8 illustrates the operation of a truck automation unit, according to an embodiment.

FIG. 8 illustrates the operation of a truck automation unit 212, according to one embodiment. Some of the tasks of the truck automation unit 212 are to maintain knowledge of equipment disposition in the equipment model, to identify materials in transport through the out-of-ground model unit 206, and to ensure safety and coordination between other elements of the mining process. The truck automation unit 212 is also used to move a number of haul vehicles from point to point in the mine according to a schedule, and to help these vehicles dock at a loader or shovel and dump at the plant or waste area.

The vehicle automation unit 212 comprises a navigation system sub-unit 804 for vehicle localisation, sensing 806 and actuation means 808 of the vehicle, and a control system sub-unit 810 to drive the vehicle along a specified trajectory. The navigation system 804 fuses navigation sensor information to provide vehicle pose, where pose includes position, velocity and attitude (PVA). Navigation sensors 806 include position sensors such as GPS, dead reckoning from onboard sensors and IMU and perception sensors such as laser and radar scanners. The control system 810 provides full control for autonomous operation. Partial control can be provided to automate certain actions if an operator is present, e.g. the autonomous positioning at a shovel.

The truck automation unit 212 allows two operational modes. In the fully autonomous mode, the truck automation unit 212 may have a remote user interface 812 to receive tasks 814 and the vehicle status 816. The truck performs the tasks under the control of the control system sub-unit 810, and using the sensors 806 and the actuators 808. In the partial autonomous mode, the truck automation unit 212 performs any of the tasks performed in the fully autonomous mode, at the request of the operator 213, and the system can be manually overridden and directly controlled by an operator 213 at any time.

The navigation system sub-unit 804 is responsible for producing estimates of the vehicle's current position, velocity and attitude (PVA) including uncertainty. Filtered PVA estimates are provided in real time. Other sensor subsystems, including artificial targets, for relative location at loaders and plant can also be included. The control system 810 receives desired trajectories from the base station 202 or scheduling system of the equipment model unit 208 in fully autonomous mode via the communication interface 830. The controller system sub-unit 810 uses PVA estimates from the navigation system sub-unit 804 to control vehicle motion. Interaction with the MPC is through the communication interface 830 to the centralised equipment model and out-of-ground model. Coordinated scheduling with other equipment is undertaken by the equipment model unit 208. Peer-to-peer communication is implemented between the control system 810 of the truck automation unit 212 and other local vehicles and the shovel automation unit 218 through the peer-to-peer communication interface 832.

In one embodiment, the truck automation unit 212 further comprises a safety system unit 818 which enables actuation of the vehicle when the safety conditions are met. The safety system comprises an independent local and remote emergency stop 820, local obstacle sensing 822, and internal status monitoring 824. Interaction with other local vehicles or equipment is direct with on-board safety systems. This ensures appropriate response speeds. In the event of an emergency, the safety system sub-unit 818 overrides the actuation requests from the control system 810 in order to safely bring the vehicle to a minimum energy state.

The truck automation unit 212 includes manual controls 826 which are mechanically connected to the vehicle or connected through drive-by-wire. User interaction overrides autonomous control.

In one embodiment, the truck automation unit 212 performs the following tasks:
Precision localisation;
Platform motion control;
Collision sensing, positive and negative obstacles;
Multi-vehicle scheduling;
Autonomous positioning at shovel;
Autonomous positioning and dumping at plant or waste area;
Material load characteristics; and
Scheduling information.

In one example, the truck automation unit 212 has the following performance parameters:
Trajectory following cross track error <50 cm;
Localisation error <25 cm;
Localisation estimates available at >50 Hz;
Local collision sensing range 100 m;
Various obstacle types may be detected;
Positioning at shovel to relative error <50 cm;
Positioning at plant error <25 cm;
Position at dump error <50 cm; and
Interaction with other equipment/operators <0.5 s delay.

3.3 Face Inspection

Figure 9:
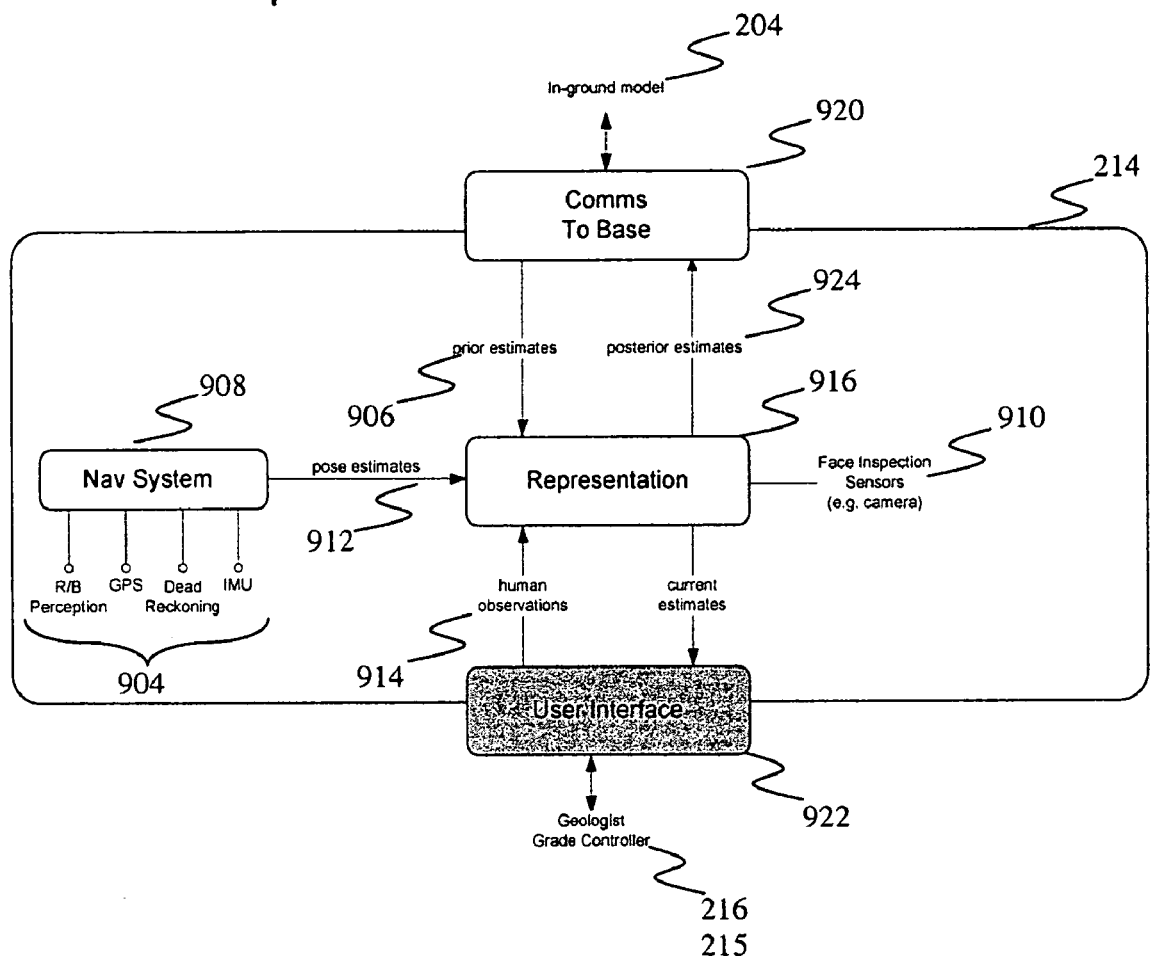
FIG. 9 illustrates the operation of a face inspection unit, according to an embodiment.

FIG. 9 illustrates the operation of a face inspection unit 214, according to one embodiment. The face inspection unit 214 may be located on a mobile sensor station operated by a grade controller 215. The face inspection unit 214 performs automated face inspection using sensors 910 to automatically acquire both geometric and geological information at the current mining face. This information is fed back in real time to provide an accurate local model of mining grade, tonnage and lump-fine ratio. In turn, this allows direct control of the block-out and physical mining process. The face inspection process is a link between the in-ground and out-of-ground models. Automation of this process provides a direct feed into improving knowledge of the geology and grade, and providing quality information for controlling the excavation and loading process.

In one embodiment, automation of the face inspection unit 214 refers to data fusion. Two operational modes are possible: a semi-autonomous mode using human input and a fully autonomous mode. In the semi-autonomous mode, a geologist 216 aids with geology recognition. One option is to let an algorithm segment camera images while a remotely located geologist 216 labels the segments, either in real-time or post-acquisition. In the fully autonomous mode, geology recognition is performed by the face inspection unit without any human intervention.

Operation of the face inspection unit 214 is as follows: prior estimates 906 of the mine face geometry and geology stem from the in-ground model. The objective is to update the representation using information acquired by the sensor suite 910 on the vehicle. A navigation system 908 is used to estimate the global pose of sensors 910 such as cameras. By fusing camera observations, pose estimates 912, and human input 914 a local geological and geometric representation is built in the representation module 916. Module 916 uses the prior estimates 906 together with the information from the face inspection sensors 910 to generate posterior estimates 924. The posterior estimates 924 are returned to the in-ground model unit 204 via the communication interface 920, and are then fused into the in-ground model.

This representation 916 is sent to the in-ground model unit 204. The grade controller 215 may operate the vehicle and monitor the operation.

In one embodiment, the face inspection unit 214 performs the following tasks:
  Acquire geometry and geology map of the face;
  Fuse information into a local map;
  Display raw data and local map;
  Send current estimates to in-ground model; and
  Compute lumped mass model and characterisation for out-of-ground model.

In one example, the face inspection unit 214 has the following performance parameters:
  Map accuracy (geometry)<25 cm;
  Geology classification accuracy <10%;
  Timeframe:
    Locally <50 ms;
    Communication with in-ground model: <5 s; and
  Penetrative sensors may be required due to coatings from dust.

3.4 Shovel Automation Unit

Figure 10:
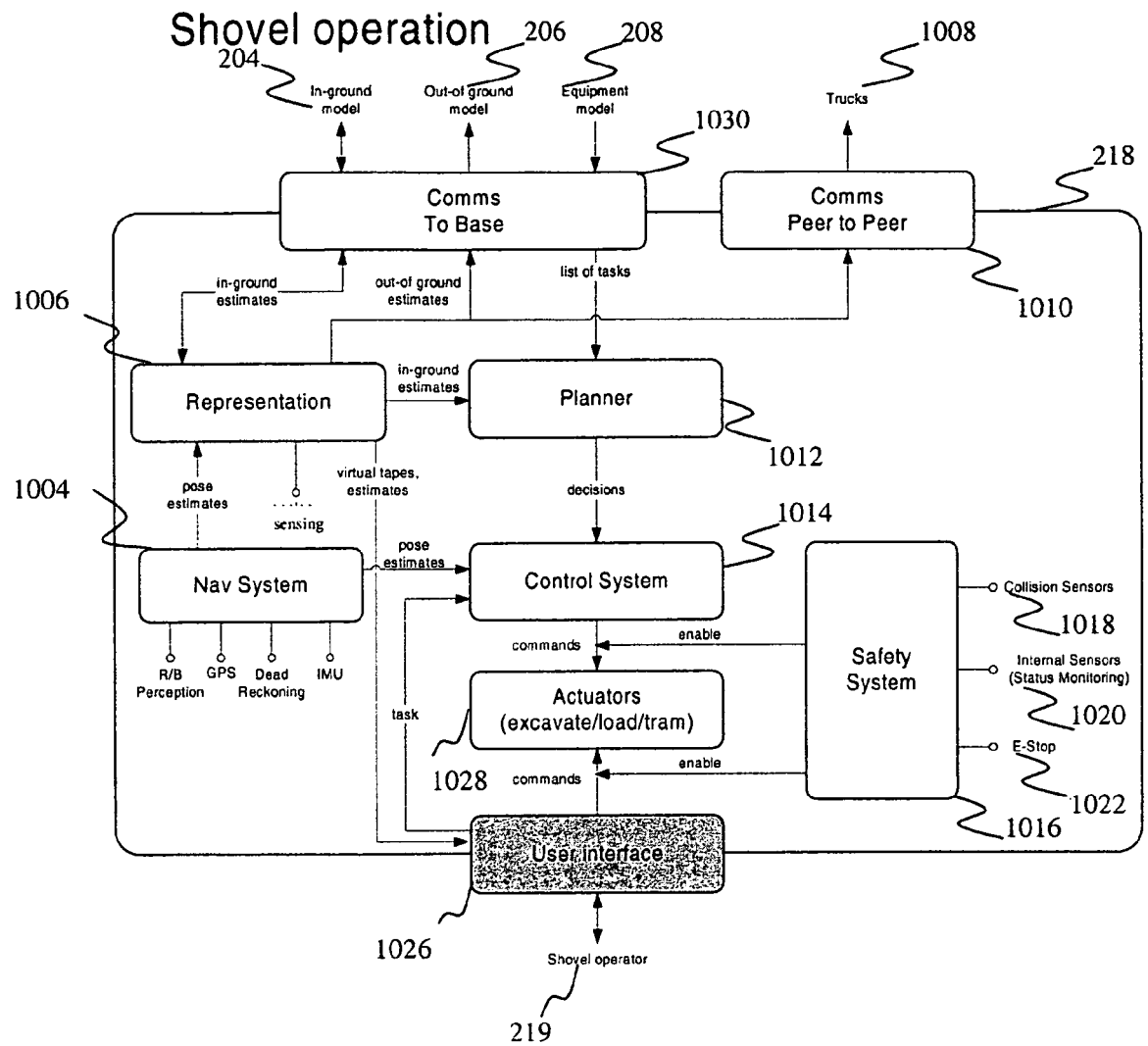
FIG. 10 illustrates the operation of a shovel automation unit, according to an embodiment.

FIG. 10 illustrates the operation of a shovel automation unit 218, according to an embodiment. Excavation, which is the removal of material from a reasonably well characterised geometric and geological structure, is one of the largest sources of increase in uncertainty in the whole mining process. Shovel automation reduces this uncertainty through two mechanisms: firstly, by acquiring information on where excavation occurs and what exactly is being excavated at any given time, and secondly, by exploiting this information in real time to optimise and control the material excavation and loading process. Shovel automation involves sensing the geometry and geology of the face and bucket, and controlling the real-time operation of excavation by using the sensed geometry and geology.

The shovel automation can be operated in two modes. In the first operational mode, the shovel is fully controlled by a shovel operator 219. The sensing system is employed to determine what material is excavated and to aid the operator to see through dust and rain. In this mode, the shovel automation unit 218 comprises a user interface 1026 used by the shovel operator 219 to control all actuations, as performed by the actuators 1028. In a second operational mode, all of the shovel functions are automated, including excavating, loading, and tramming.

In the non-autonomous mode, only data fusion is automated. Prior information about the geometry and geology of the face is received from the in-ground model unit 204, and is communicated to the shovel automation unit 28 via the communication interface 1030. Geology sensors like cameras are used to estimate what material is currently excavated. Combining this information with an estimate of the bucket position obtained from a navigation system 1004, a local representation 1006 is built. Information about the excavated material is sent to the in-ground model unit 204 and the out-of ground model unit 206 via the communication interface 1030. The same information can also be sent locally to the truck 1008 which is loaded with the excavated material if operational units are provided with peer-to-peer communication 1010. The shovel operator 219 controls excavation, loading, and tramming of the shovel in this mode. A safety system 1016 can override the operator's commands in both cases.

Two types of interactions are illustrated in FIG. 10:
  1. manual control (operating actuators 1028 directly), and
  2. supervisory control (feeding higher-level tasks to the control system sub-unit 1014).

The shovel operator 219 may also receive information from the representation sub-unit 1006 aimed at augmenting the operator's perception. Collected sensor data can be used to assist the operator's vision through dust and rain. Heads-up displays could show virtual tapes projected onto the mine face to display the block-out boundaries to the operator.

In the autonomous mode, both data fusion and control of the shovel are automated. A planner sub-unit 1012 receives a list of high-level tasks from the equipment model unit 208 and is responsible for producing lower-level control decisions for all subsystems (such as excavation, loading, tramming). The process takes current estimates of the mine face geometry and geology into account before these decisions are translated into physical actuation commands by the control system sub-unit 1014. In this mode, the safety system 1016 makes use of collision 1018 and status 1020 monitoring sensors to decide when to disable actuation. Remote E-Stops 1022 can also be used to achieve this purpose.

In one embodiment, the shovel automation unit 218 performs the following tasks:
  Sense geology and geometry of face;
  Track bucket position;
  Display block-out information (virtual tapes), in the non-autonomous mode;
  Assist in vision through dust and rain, in the non-autonomous mode;
  Communicate information to trucks;
  Automate excavating/loading/tramming, in the autonomous mode; and
  Employ safety system, in the autonomous mode.

In one example, the shovel automation unit 218 has the following performance parameters:
  Geometric resolution at face <25 cm;
  Grade estimation error <10%;
  Bucket tip position error <25 cm;
  Relative position error (bucket to haul truck)<50 cm, in the autonomous mode;
  Relative position error (bucket to face)<50 cm, in the autonomous mode.

3.5 Real-time Assay Unit

Figure 11:
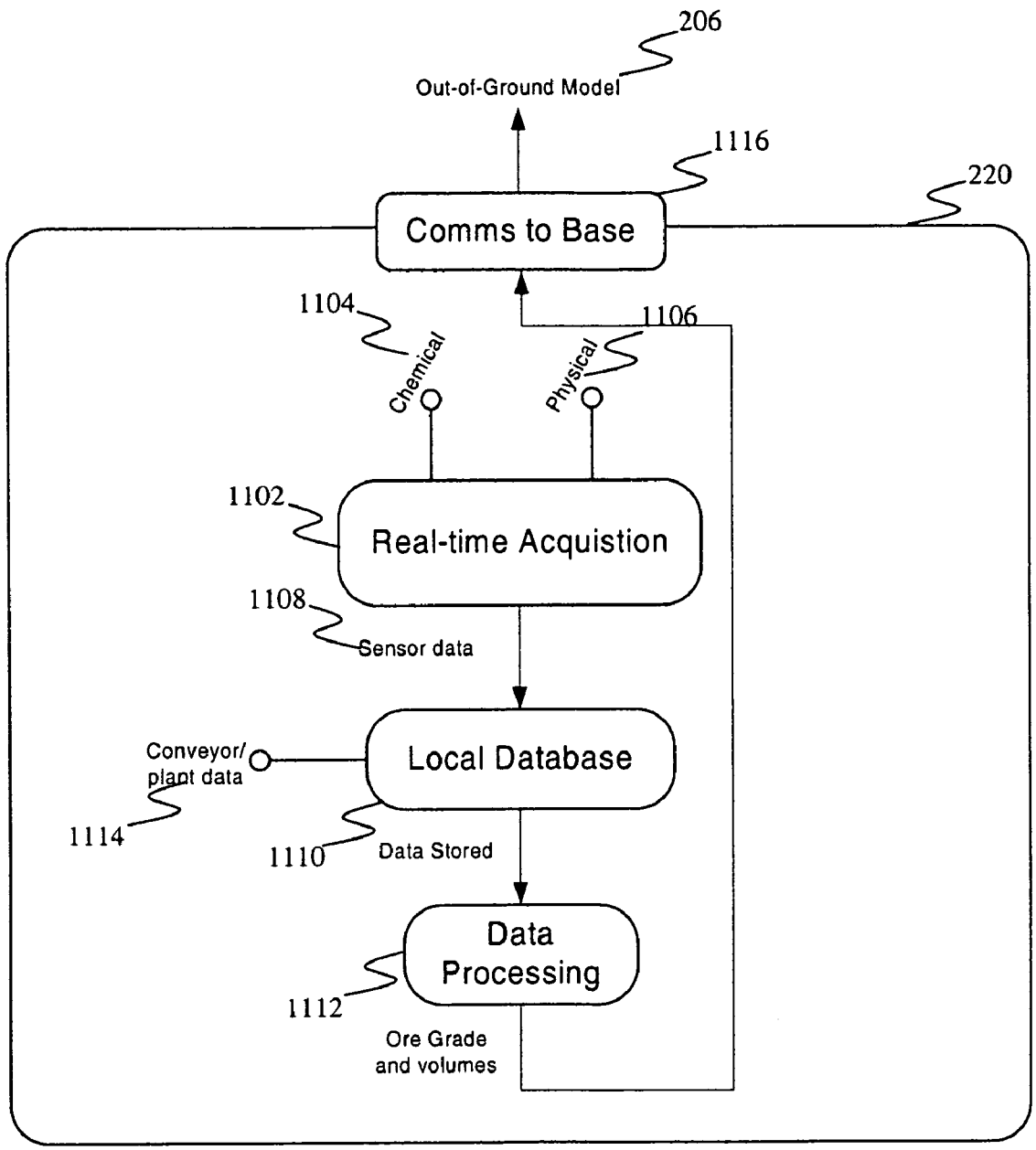
FIG. 11 illustrates the operation of a real-time assay unit, according to an embodiment.

FIG. 11 illustrates the operation of a real-time assay unit 220, according to one embodiment. The real-time assay unit 220 performs chemical assays on ore grades in the process plant. These chemical assays are performed in a real-time or near real-time mode. The results of these assays are sent to the out-of-ground model unit 206 via the communication interface 1116. Doing real-time assays significantly reduces the time-delay between obtaining the sample and delivering the chemical assay that is present when assays are performed periodically. The near real-time chemical assays reduce uncertainty and increase predictability of stockpiled material at the time a stockpile is created. Real-time or near real-time grade estimates can also be used to provide feedback to control the material excavation and transport process through the base station.

The real-time assay unit 220 includes a real-time data acquisition module 1102. Data is acquired from in-line chemical sensors 1104 which can be based on spectral or diffraction principles. Sensors 1106 measuring physical characteristics, such as mass and volume, which can be based on frame-rate laser imagers also provide sensor data to the real-time assay unit. Local sensor data 1108 is stored in a local database 1110 and local estimates of grade and volume are computed in a data processing module 1112. This information is tied to other plant data 1114 to reconcile with both incoming ore from haul vehicles and the creation of the stockpile. Information on volume and grade is then sent to the out-of-ground model 206 via the communication interface 1116 for fusion.

In one embodiment, the real-time assay unit 220 performs the following tasks:
  Acquire chemical information from the material in the conveyor belt;
  Acquire physical information for volume estimation; and
  Send current estimates to out-of-ground model.
In one example, the real-time assay unit 220 has the following performance parameters:
  Timeframe:
  Locally: real-time ~ms;
  Communication with out-ground model: ~min; and
  Grade prediction: 0.1% accuracy.

3.6 Automated Charging Unit

Figure 12:
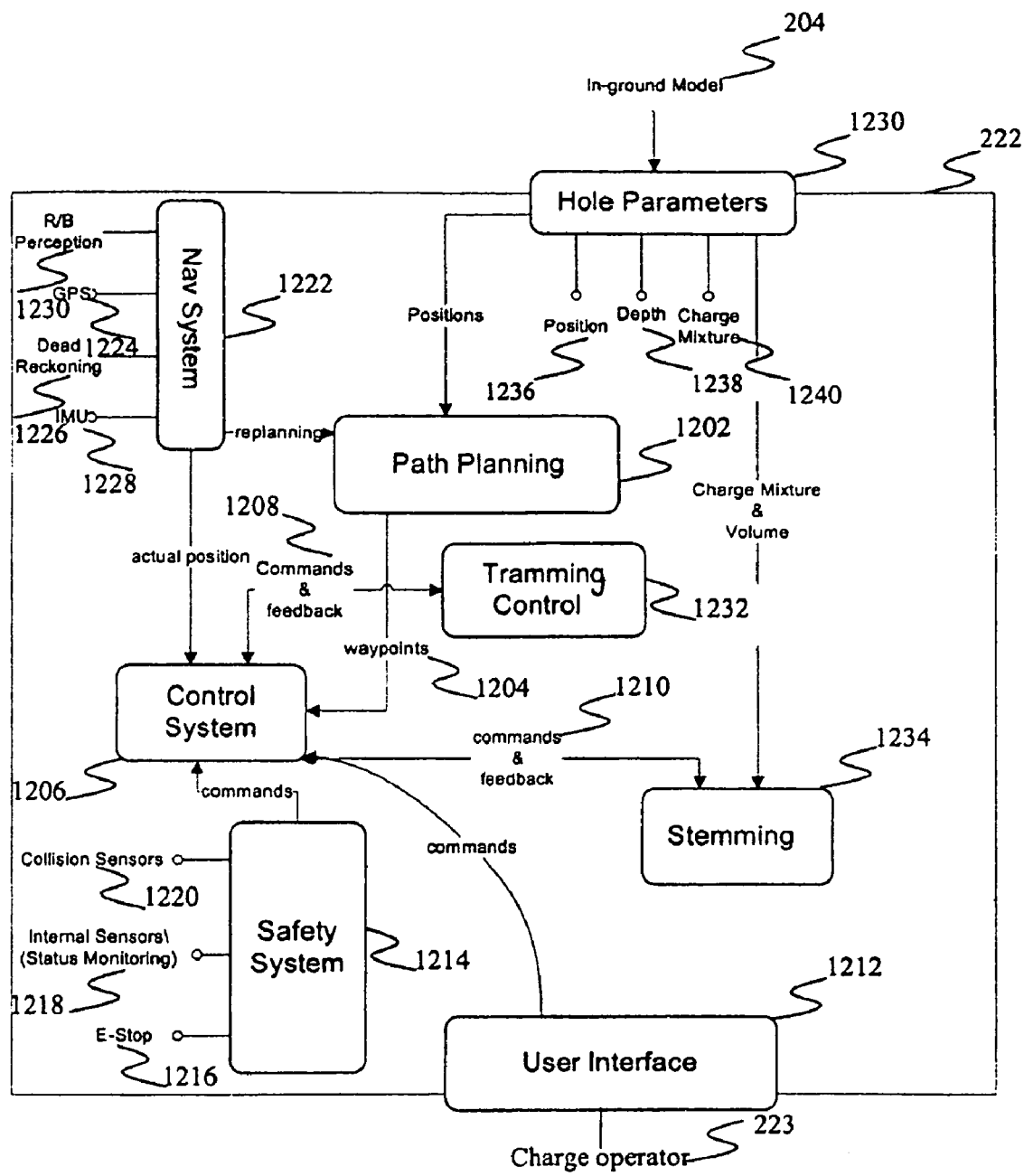
FIG. 12 illustrates the operation of an automated charging unit, according to an embodiment.

FIG. 12 illustrates the operation of an automated charging unit 222, according to one embodiment. Automated charging is the process of loading and stemming drilled holes with the correct mix of explosive. One objective of this process is to produce a blast pattern that will fracture the rock into particles of the required size for further processing.

In order to achieve this purpose, the system has to know certain hole parameters 1230: the positions of the holes 1236, their depth 1238, and the mix of blasting material 1240 for each hole. A further requirement is the autonomous navigation from hole to hole. The automated charging unit 222 calculates an optimum path using path planner 1202 and inputs the generated waypoints 1204 to the control system which in turn provides commands to the tramming control 1232. The tramming control 1232 controls the autonomous navigation that facilitates tramming between the holes. Once the vehicle reaches a hole, the automated charging unit 222 stems it with the required mixture of explosive. The stemming operation is controlled by the stemming controller 1234 which is in communication with the control system 1206.

The automated charging unit 222 has the functions of displaying a map of the bench, real-time positioning of the vehicle, providing projected/actual hole dimensions and depths, displaying required charge and hole depth, and informing about the vehicle status. This is done through the user interface 1212.

The automated charging unit 222 receives information 1230 about the holes (such as their positions on the bench, their dimensions, etc) and the desired mixture 1240 of explosive for each hole from the in-ground model unit 204. A path planning sub-unit 1202 takes the positions and uses a known starting position to calculate the optimum path for filling the holes. This path is in the form of a set of waypoints 1204 which is sent to a control system 1206. The control system 1206 issues the necessary commands for tramming 1208 between and commands for stemming 1210 the holes. Tramming and stemming may be either fully or partially automated. In the event that corrections need to be applied to the path or that the sequence for drilling holes is altered by an operator 223, a new set of waypoints may be generated online. The automated charging unit 222 comprises a user interface 1212, allowing the operator 223 to monitor the vehicle for tramming and stemming steps. In one embodiment, the automated charging unit 222 further comprises a safety system 1214 monitoring the vehicle. The safety system comprises an e-stop function 1216 and sensors for detecting collisions 1218 and any internal error events 1220.

The automated charging unit 222 also has a navigation system 1222 that fuses navigation sensor information to provide vehicle pose, the pose including position, velocity and attitude (PVA). Navigation sensors include position sensors such as GPS 1224, dead reckoning from onboard sensors 1226, IMU 1228, and perception sensors 1230 such as laser and radar scanners.

In one embodiment, the automated charging unit 222 performs the following tasks:
  Position the machine over the hole;
  Load and stem the blast holes with the required mixture and quantity;
  Calculate the charge mixture and quantity for each hole; and
  Obtain hole geometry and geology (actual and predicted).
In this example embodiment, the automated charging unit 222 has the following performance parameters:
  Positioning of ~5 cm;
  Loading resolution of ~1 m;
  Charge mixture 10% error; and
  Hole depth ~10 cm.

3.7 Autonomous Real-time Survey Unit

Figure 13:
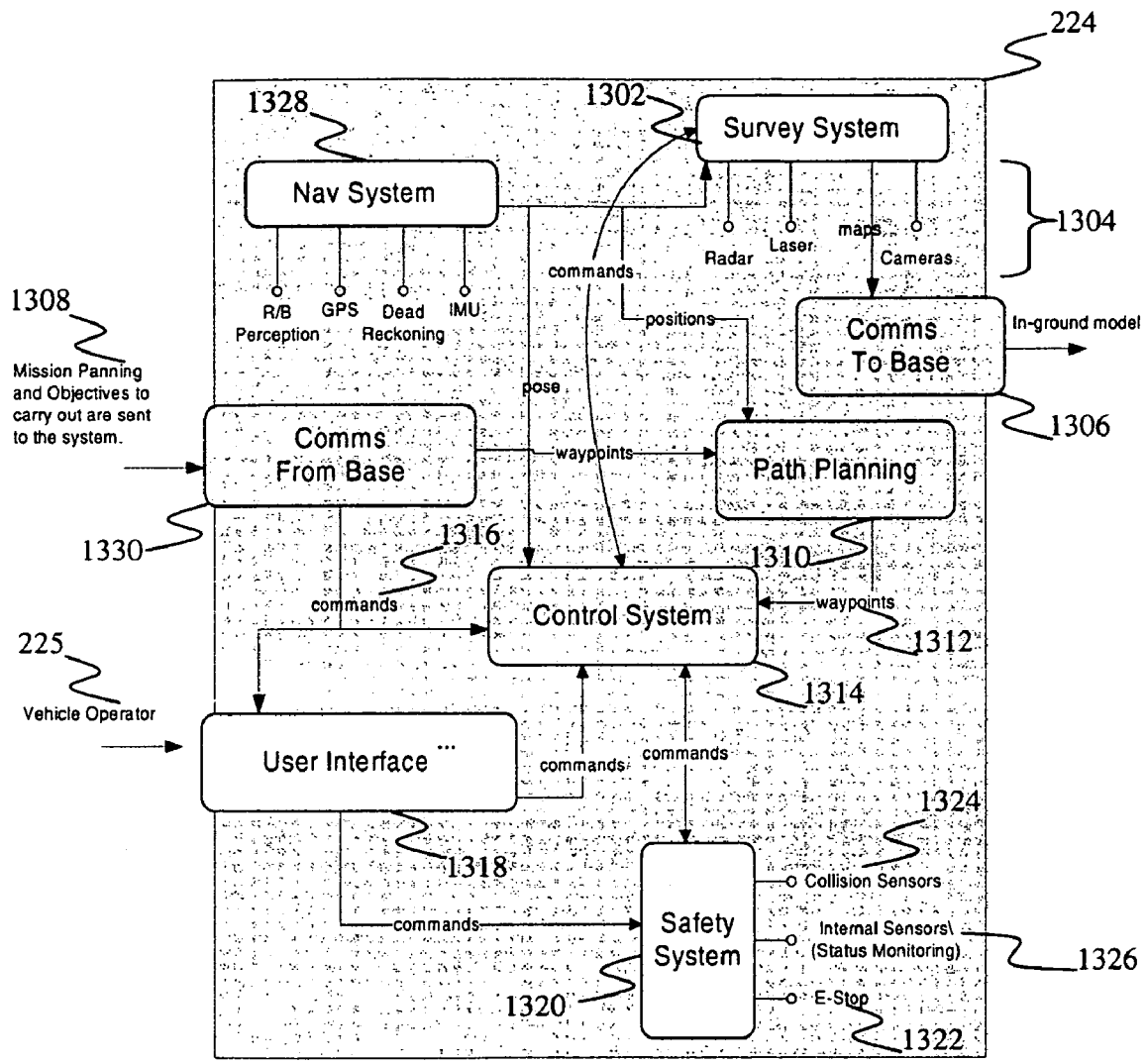
FIG. 13 illustrates the operation of an autonomous real-time survey unit, according to en embodiment.

FIG. 13 illustrates the operation of an autonomous real-time survey unit 224, according to one embodiment. The autonomous real-time survey unit 224 provides complete and accurate geometric models of the mine in a timeframe allowing both planning and platform automation. It includes building and maintaining a geometric model of both in-ground and out-of-ground stocks, faces, block-outs, stockpiles and mine walls.

The real-time surveying system 1302 uses data from multiple types of sensors 1304 on both stationary and mobile platforms to capture the required geometry information. Fixed platforms may be sited at the edges of pits, providing updates as the geometry changes and around stockpiles to provide volume estimation. Mobile platforms may include ground vehicles, mining machinery or aircraft which can update the geometry of active faces, roads and other mine infrastructure.

The real-time surveying system 1302 requires the ability to accurately fuse data from the different sensor technologies 1304 (such as radar, laser, GPS and cameras) to produce accurate and timely representations of the mine geometry. The survey results are sent to be integrated into the main database system via the communication interface 1306 The information collected by the autonomous real-time survey unit 224 is autonomously fused with the existing geological block model to update the in-ground stock information. Out-of-ground stock information is also updated following the same process. No human intervention is required to update the in-ground and out-of-ground stocks information. It is also possible to download this information to platforms in real-time to permit automation.

Timeframes for the generation of survey data may be of the order of minutes for actual mining operations (such as shovel operations), of hours for bench surveying, of days for stockpiles, of weeks for roads and of months for overall mine geometry (such as flyovers), for example. The timely provision of geometric models of both in-ground and out-of-ground stocks, faces, block-outs, stock-piles and mine walls enables an efficient and safe production.

The autonomous real-time survey unit receives a mission and objectives 1308 from a base station database. A path planning sub-unit 1310 takes the positions and uses a known starting position to calculate an optimum path to achieve these objectives. The path is represented as a set of waypoints 1312 which are communicated to a control system 1314. The control system 1314 issues commands 1316 for executing the path and activating the surveying instruments. Corrections or changes to the path may be made with new waypoints if necessary.

A user interface 1318 is used to display maps of the whole mine, maps of part of the mine or maps of individual benches/faces. The user interface is also used to display the location of major mining stocks such as vehicles in a timely manner. The vehicle may or may not be controlled by an operator 225, and if there is an operator 225 he or she may control the vehicle remotely.

In one embodiment, a safety system 1320 monitoring the vehicle is added to the autonomous real-time survey unit 224. The safety system 1320 has an e-stop function 1322 and sensors for collision detection 1324 and internal events 1326. The user interface 1318 allows the user to monitor the vehicle and its status.

If the autonomous real-time survey unit 224 is mobile, all sub-units illustrated in FIG. 13 are required for the functioning of the autonomous real-time survey unit 224. However, if the autonomous real-time survey unit 224 is stationary, only the survey system 1302 and the communication sub-unit 1306 are required. Monitoring functionalities may also be added to the stationary autonomous real-time survey unit 224.

The autonomous real-time survey unit 224 has a navigation system 1328 that fuses navigation sensor information to provide vehicle pose, the pose including position, velocity and attitude (PVA). Navigation sensors include position sensors such as GPS, dead reckoning from onboard sensors, IMU and perception sensors such as laser and radar scanners.

In one embodiment, the autonomous real-time survey unit 224 performs the following tasks:
Obtain accurate knowledge of the geometry of the mine;
Monitor of stockpiles for volume estimation;
Integrate and fuse the three-dimensional information with information held in the existing database system; and
Calculate volumes from survey data.

In one example, the autonomous real-time survey unit 224 has certain performance parameters, including that the accuracy of positions be of the order of cm.

In one embodiment, a safety system unit (such as 618, 710, 818, 1016, 1214 and 1320) can be shared and used by all operation units of the mine. It should be understood that all sub-units constituting an operation unit can be regrouped into a single unit.

4 Navigation and Other Sensors

In one embodiment, different types of sensors are connected to the navigation systems used in the different operation units such as the auto tramming unit of drills 702, the truck automation unit 212, the face inspection unit 214, the shovel automation unit 218, the automated charging unit 222, and the autonomous real-time survey unit 224. Navigation sensors can be divided into at least three main groups: sensors that provide dead reckoning information (such as encoders), sensors that provide positioning of an operation unit, and sensors that give information of the surrounding environment (such as lasers).

Dead reckoning is the most basic form of localisation. It consists of integrating a vehicle motion model over time. A motion model calculates the vehicle motion based on some sensory information such as velocity or acceleration, for example. Dead reckoning sensors comprise, but are not limited to, encoders, inertial measurement sensors and compasses.

Positioning sensors such as GPS allow the localisation of the operational unit. Different accuracies can be achieved depending on the operation mode. Operation modes can comprise an autonomous mode, a differential mode or an RTK (Real Time Kinematics) mode, for example. In environments with no satellite coverage, such as indoor environments, pseudolites can be used as positioning sensors. Pseudolites are transceivers used to create a local ground-based GPS.

Surrounding environment sensors provide information about the surrounding environment of the operation unit and this information is used for navigation. For example, lasers or radars can be used to localise a vehicle relative to the external world or to detect an approaching vehicle. This group comprises sensors such as lasers, radars and cameras. Since the observations are relative to the sensor position, they provide information of the surrounding environment.

In one embodiment, the sensors provide redundant information about the location of the operation unit. This redundancy increases the safety and robustness of the navigation system.

In one embodiment, geometry sensors are used by operation units such as autonomous real-time survey units to capture the geometry of the mine. These sensors can be installed on both stationary and mobile platforms to capture the required geometry information. Stationary platforms may be sited at the edges of pits, providing updates as the geometry changes and around stockpiles to provide volume estimation. Mobile platforms may include ground vehicles, mining machinery or aircraft that update the geometry of active faces, roads and other mine infrastructure.

In one embodiment, geometry sensors can be grouped into two main categories, namely the active sensors category and the passive sensors category. Active sensors are sensors that emit an electromagnetic signal and analyse the time of flight of the return in order to get an estimate of the target distance. This category comprises, but is not limited to, lasers, radars and sonars. Cameras represent the most common passive sensors. They passively measure the light reflected by an object in order to get a spatial representation of an object spectrum. As a camera only gives a 2D representation, several cameras can be used to obtain a 3D representation. Using several pictures taken from different vantage points, the third dimension is obtained using triangulation methods, for example. This is referred to as stereopsis. Any technology using information from active and/or passive sensors in order to render a range-image (image in which information provided to a user is a point having 3D coordinates) can be used.

In one embodiment, geology sensors are used to build the in-ground model. The in-ground model is responsible for integrating information from survey, rock recognition, face inspection, chemical assays and exploration holes to better model and predict the geometry and geology of materials in the ground. Geology sensors can be grouped according to their application into at least 4 groups: borehole sensors, ground sensors, hand-held sensors, and laboratory sensors. Geology sensors can be based on different technologies. For example, gamma and neutron sensors are based on nuclear technology, X-ray fluorescence spectroscopy sensors and laser induced breakdown spectroscopy sensors are based on spectro-chemical properties, microwave or radio imaging sensors are based on electromagnetic sensing and resistivity sensors are based on electrical analysis.

5 Statistical Processes

In one embodiment, the in-ground fusion algorithm is based on Gaussian Processes (GPs) to better predict the volume and grade of the in-ground material. Gaussian processes are probabilistic models used to model spatially correlated data. A group of samples is spatially correlated when a level of dependency exists between samples located nearby. This is the case in geology where samples collected in a same area exhibit a large degree of similarity in both chemical and mechanical properties. By modelling the spatial correlation of the data, a statistical model can better estimate the properties and the respective uncertainty in unobserved areas.

In one embodiment, GPs use the "Kriging" method to create a statistical model. For example, if the fusion algorithm has to predict the concentration of iron in a specific area of the mine, interpolation over measured locations is performed through GPs which place a probabilistic distribution over functions that map inputs (sensor measurements and pose) to outputs (grades). GPs can be trained in a fully Bayesian approach avoiding any manual determination of calibration parameters and minimising the dependence on human expertise.

Figure 14:
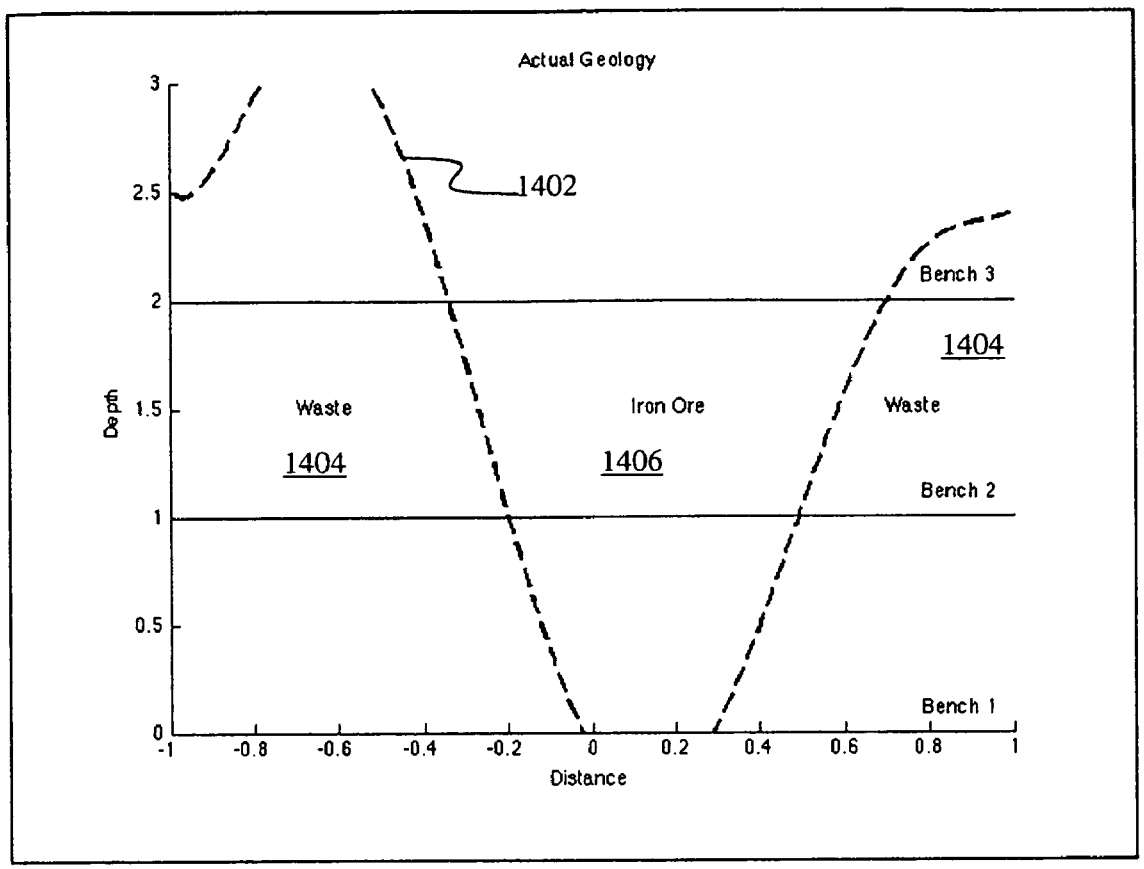
FIG. 14 illustrates an actual geology of a terrain, according to an embodiment.

FIGS. 14 to 17 illustrate the operation of an in-ground GP fusion algorithm to fuse data of geological observations coming from different benches and to predict the geometry and geology of these benches (in-ground model). FIG. 14 illustrates the real geology of a cross-section of a terrain. The cross-section is divided into three benches. The dashed line 1402 represents the real boundary between waste zones 1404 and iron ore zones 1406 of the cross section. The objective of the fusion is to give a prediction of this dashed line 1402 in order to estimate the waste/iron ore boundary from observations coming from different operation units while using a Gaussian process.

Figure 15:
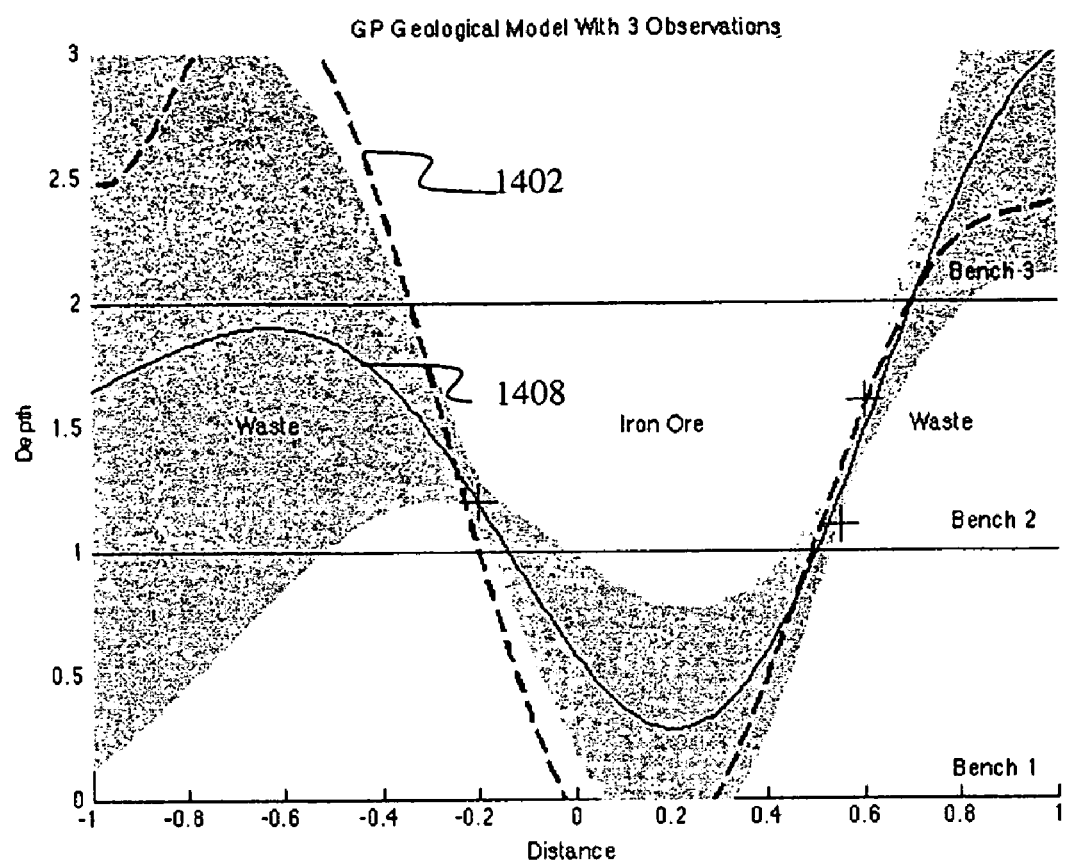
FIG. 15 illustrates a prediction of an actual geology of a terrain based on observations taken in one bench of ore, according to an embodiment.
Figure 16:
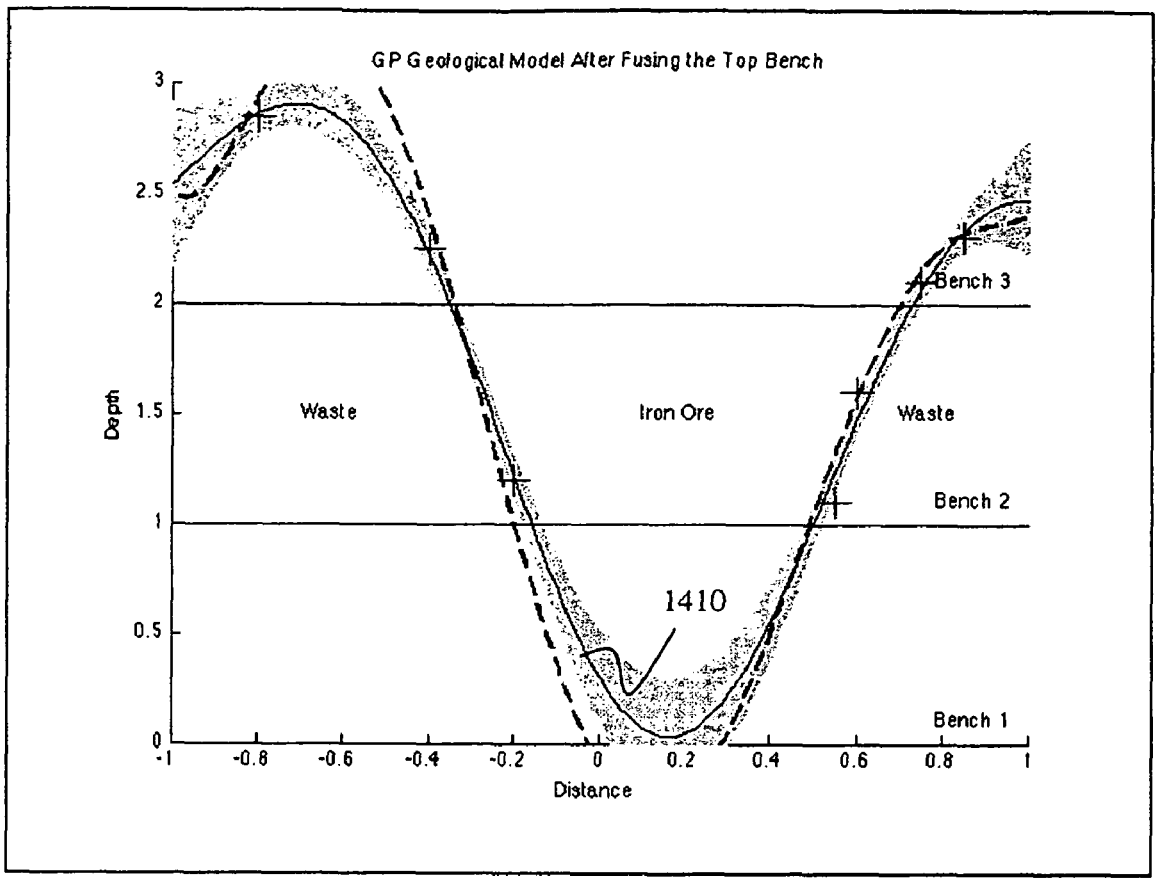
FIG. 16 illustrates a prediction of an actual geology of a terrain based on observations taken in two benches, according to an embodiment.
Figure 17:
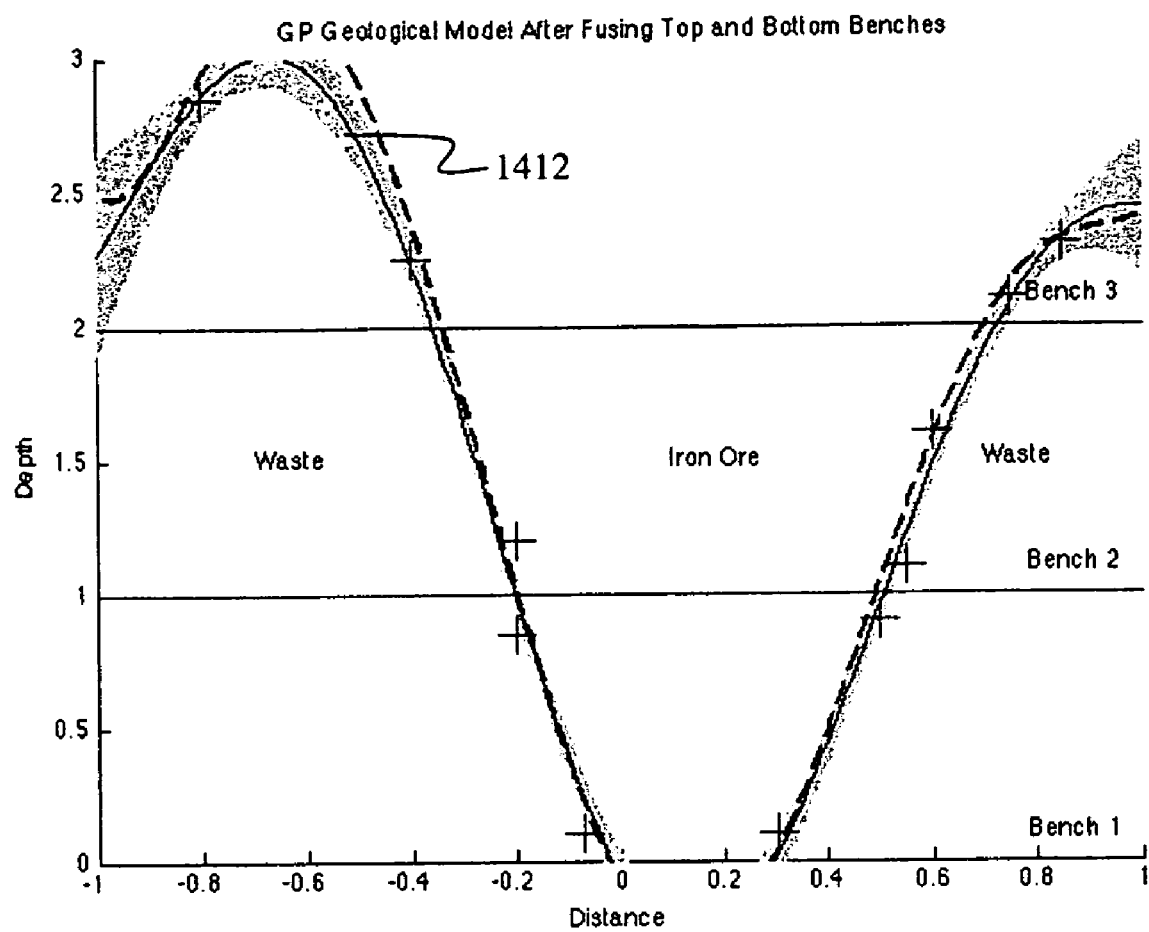
FIG. 17 illustrates a prediction of an actual geology of a terrain based on observations taken in three benches, according to an embodiment.

FIG. 15 illustrates an estimate of the boundary between ore and waste zones. In this case, three observations (represented by crosses) are only taken in bench 2. Nothing is known about the top and bottom benches and prediction is computed exclusively from the middle bench observations. The result of a Gaussian process using a squared exponential covariance function is the unbroken line 1408. The grey areas surrounding line 1408 represent the uncertainty of the prediction. This uncertainty is larger in areas far from the observations (crosses). In order to reduce the uncertainty, observations are taken in areas of high uncertainty. FIG. 16 illustrates the estimate of the boundary when additional observations are taken in areas of bench 3 where the uncertainty is important. When three observations are taken from both benches 2 and 3 and applied in the Gaussian process, the resulting estimate 1410 of the boundary is closer to reality and uncertainty is decreased, as illustrated in FIG. 16. This improvement is confirmed by FIG. 17 which illustrates the estimate 1412 of the boundary when observations are taken in the three benches. In this process, observations from one bench are fused with a precedent estimate model to improve the geology prediction and reduce the uncertainty.

In one embodiment, dependencies between two or more ores can be used in the Gaussian process to reduce the sparseness of the data. For example, the concentration of iron in a particular region might be related to that of phosphorus. If first assays are obtained in a first location to estimate the iron concentration and, in a second location, second assays are obtained to estimate the phosphorus concentration, the concentration of phosphorus in the first location can be predicted using the concentration of iron and vice versa. This process is referred to as a "Co-Kriging" technique.

While throughout the description, the in-ground model unit 204 and out-of-ground model unit 206 use the equipment model to know the location of an operation unit from which they receive in-ground and out-of-ground information, respectively, it should be understood that the location information can be sent directly from the operation unit to the in-ground 204 or out-of-ground model unit 206.

The system and method described herein has application in a range of areas including agriculture, forestry, marine resources and defence. As an example of these further applications we describe how the system and method can be employed in agriculture. In an agricultural application the in-ground model may consist of soil information and data relating to economically useful plants or crops. The in-ground model obtains, through sensing, an integrated picture of the geometry, chemical composition, and crop health over the required area. This is maintained using data fusion algorithms to ensure that a real-time description of all relevant properties is maintained. Information may be obtained from a number of sensors on the ground or even from the air, as in the mining application. The out-of-ground model describes the crop as it is harvested from the area. During harvesting sensor measurements of yield and composition can also be made. These out-of-ground characteristics can be linked back to in-ground characteristics thus yielding a similar relationship to the models encountered in the mining embodiment. The equipment model describes the use of platforms for seeding, fertilising, watering and ultimately harvesting the crop. The equipment has an effect on the in-ground description of the environment and, through this effect, links the in-ground to the out-of-ground model, again in a similar manner to the mining embodiment. The three models together; in-ground, out-of-ground, and equipment, are used to form the overall integrated picture of the agricultural operation that may be used for monitoring and automation. Parallels to these three models exist in most applications of automation to resource monitoring and exploitation.

In a similar manner, fusion of pre-processing information may also be used for drainage or irrigation applications. Further applications may also include the fusion of information for estimating properties of the ocean or other liquid bodies. Maritime examples include the use of the "pre-intervention" model to estimate properties such as ocean temperature and salinity. "Post-intervention" estimates may relate to fish or minerals extracted from the ocean, and equipment and operation units may include items such as fishing boats. A further example of this application includes applying a pre-intervention model (i.e. an 'in-ground' model) to ocean estimation for submarines and sonar modelling.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiments. It should be noted that the embodiments of the invention described above are intended to be exemplary only. The scope of the invention is therefore intended to be limited solely by the scope of the appended claims.

It will be understood that the invention disclosed and defined in this specification extends to all alternative combinations of two or more of the individual features mentioned or evident from the text or drawings. All of these different combinations constitute various alternative aspects of the invention.

The term "comprises" (or its grammatical variants) is used in this specification as equivalent to the term "includes" and neither term should be taken as excluding the presence of other elements or features.

What is claimed is:

1. A system for use in controlling a resource-extraction operation in an environment in which a plurality of equipment units are deployed for the extraction of at least one resource from the environment, the system comprising:
  a) a pre-extraction modeling unit in data communication with a first plurality of heterogeneous sensors that in use measure features of the environment, wherein the pre-extraction modeling unit is programmed to fuse the data from the first plurality of sensors that comprises a spatial description of the environment and an estimate of a distribution of the at least one resource in the environment;
b) an equipment modeling unit comprising data input means configured to receive equipment data relating to the plurality of equipment units operating in the environment and a processor programmed to combine the equipment data into an equipment model describing the equipment units;
c) a post-extraction modeling unit in data communication with a second plurality of sensors that in use monitor information relating to material extracted from the environment, wherein the post-extraction modeling unit is programmed to fuse the data from the second plurality of sensors into a post-extraction model descriptive of material extracted from the environment; and
d) a data communication system that communicates requested information from at least one of the pre-extraction model, the equipment model, and the post-extraction model to the equipment units for use in controlling operation of the equipment units in the resource-extraction operation.

2. The system according to claim 1 wherein the pre-extraction model comprises an estimate of a distribution of the at least one resource in the environment.

3. The system according to claim 1 comprising a local modeling unit associated with at least one of the equipment units, the local modeling unit configured to receive prior estimates of a region of the environment from the pre-extraction model unit and to generate a posterior estimate dependent on the prior estimate and measurements from one or more local sensors in the plurality of heterogeneous sensors.

4. The system according to claim 3 wherein the pre-extraction modeling unit is configured to fuse the posterior estimate with the pre-extraction model.

5. The system according to claim 1 wherein the first plurality of heterogeneous sensors provide information at multiple spatial scales and the pre-extraction modeling unit comprises a registration unit configured to spatially register the information dependent on the equipment model.

6. The system according to claim 1 wherein the pre-extraction modeling unit fuses data from the first plurality of heterogeneous sensors using algorithms describing spatial correlations between the input data.

7. The system according to claim 1 wherein the post-extraction modeling unit reconciles information about material extracted from the environment relating to transportation and stockpiling of the material.

8. The system according to claim 1 wherein the pre-extraction modeling unit, the post-extraction modeling unit and the equipment modeling unit communicate with one another to reconcile the pre-extraction model, the post-extraction model and the equipment model.

9. The system according to claim 1 wherein the environment comprises a mine.

10. The system according to claim 1 wherein the environment is selected from the group consisting of an agricultural region, a forestry region and a marine region containing the at least one resource for extraction.

11. A system for use in controlling a mining operation in a mine in which a plurality of equipment units are deployed for the extraction of at least one resource from the mine, the system comprising:
a) an in-ground modelling unit configured to receive data from a first plurality of heterogeneous sensors that in use measure features of the mine and to fuse the data into an in-ground model that comprises a geometric description of the mine and a description of a distribution and grade of the at least one resource;
b) an equipment modeling unit comprising data input means configured to receive equipment data relating to the plurality of equipment units deployed in the mine and a processor programmed to combine the equipment data into an equipment model describing the equipment units;
c) an out-of-ground modelling unit configured to receive data from a second plurality of sensors that in use monitor information descriptive of material extracted from the mine and to fuse the data into an out-of-ground model descriptive of material extracted from the mine; and
d) a data communication system that communicates requested information from at least one of the in-ground model, the equipment model and the out-of-ground model to the equipment units for use in controlling operation of the equipment units in the mine.

12. The system according to claim 11 wherein the in-ground model comprises resource information descriptive of the resource and selected from the group consisting of chemical, physical, geological, geophysical, mineralogical and contextual properties of the resource.

13. The system according to claim 11 wherein the out-of-ground model reconciles information about material extracted from the mine relating to transportation and stockpiling of the material.

14. The system according to claim 13 wherein the out-of-ground modeling unit is configured to reconcile material conservation of material monitored in the out-of-ground model.

15. The system according to claim 11 wherein the equipment units comprise at least one of a haul truck, a shovel, a face inspection unit, a drill, a charging unit, a survey unit and a real-time assay unit.

16. The system according to claim 11 wherein the in-ground modeling unit, equipment modeling unit and out-of-ground modeling unit update the respective in-ground model, equipment model and out-of-ground model in real time.

17. The system according to claim 11 wherein the first plurality of heterogeneous sensors and the second plurality of sensors comprise at least one of: a chemical assay unit, a positional sensor, an inertial measurement unit (IMU), a global positioning system (GPS), a dead reckoning sensor, a wheel encoder, a laser scanner, a radar scanner, a sonar scanner, a camera, a control sensor that measures a rotational speed of a drill, a control sensor that measures a pull-down pressure of a drill, an accelerometer, a tachometer, a pressure transducer, a torque sensor, a vehicle collision sensor, a vehicle internal status monitor, a sensor on a stationary platform, a sensor on a mobile platforms, a gamma sensor, a neutron sensor, an X-ray fluorescence spectroscopy sensor, a laser-induced breakdown spectroscopy sensor, a microwave sensor, a radio imaging sensor and a resistivity sensor.

18. A system for exploiting a mine, comprising:
a database storing an in-ground model and an equipment model;
a communication module for exchanging data with a plurality of operation units;
a fusion module adapted to fuse in-ground information relative to geometrical, geological and geophysical properties of an in-ground material into said in-ground model in order to update said in-ground model, to fuse equipment information relative to pieces of equipment into said equipment model in order to update said equipment model, and to fuse out-of-ground information relative to geophysical, chemical and grade properties of an out-of-ground material with information about said in-ground model and said equipment model in order to create an out-of-ground model; and at least one controller for controlling the operation of at least one of the equipment units dependent on the in-ground model, the equipment model or the out-of-ground model.

19. A computer-implemented method of controlling a resource-extraction operation in an environment in which a plurality of equipment units are deployed for the extraction of at least one resource, the method comprising:
- a) receiving data from a first plurality of heterogeneous sensors in the environment;
- b) fusing the data in an electronic system to update a pre-extraction model that comprises a spatial description of the environment and an estimate of a distribution of the at least one resource;
- c) receiving equipment data relating to the plurality of equipment units operating in the environment;
- d) combining the equipment data in an electronic system to update an equipment model descriptive of the equipment units;
- e) receiving data from a second plurality of sensors;
- f) fusing the data from the second plurality of sensors in the electronic system to update a post-extraction model descriptive of material extracted from the environment, wherein at least one of the equipment units operates to extract the at least one resource from the environment;
- g) communicating information from at least one of the pre-extraction model, the equipment model and the post-extraction model to at least one of the equipment units in the environment; and
- h) automatically controlling operation of the at least one equipment unit based on the communicated information.

20. A non-transitory computer readable medium, having a program recorded thereon, where the program is configured to make a computer execute the method of claim 19.

21. A computer-implemented method of controlling a mining operation in which a plurality of equipment units are deployed for the extraction of at least one resource from a mine, the method comprising:
- a) receiving data from a first plurality of heterogeneous sensors in the mine;
- b) fusing the data in an electronic system to update an in-ground model that comprises a geometric description of the mine and a description of a distribution and grade of the at least one resource;
- c) receiving equipment data relating to the plurality of equipment units deployed in the mine;
- d) combining the equipment data in an electronic system to update an equipment model descriptive of the equipment units;
- e) receiving data from a second plurality of sensors;
- f) fusing the data from the second plurality of sensors in the electronic system to update an out-of-ground model descriptive of material extracted from the mine, wherein at least one of the equipment units operates to extract the at least one resource from the resource;
- g) communicating information from at least one of the in-ground model, the equipment model and the out-of-ground model to at least one of the equipment; and
- h) automatically controlling operation of the at least one equipment unit based on the communicated information.

22. A non-transitory computer readable medium, having a program recorded thereon, where the program is configured to make a computer execute the method of claim 21.

* * * * *